US012663094B2

(12) United States Patent
Doffing

(10) Patent No.: US 12,663,094 B2
(45) Date of Patent: Jun. 23, 2026

(54) PLUNGER WITH REAR FACING BUMPER FOR AIR MANIFOLD

(71) Applicant: Sleep Number Corporation, Minneapolis, MN (US)

(72) Inventor: Brian Doffing, Arden Hills, MN (US)

(73) Assignee: Sleep Number Corporation

( * ) Notice: Subject to any disclaimer, the term of this patent is extended or adjusted under 35 U.S.C. 154(b) by 0 days.

(21) Appl. No.: 18/888,798

(22) Filed: Sep. 18, 2024

(65) Prior Publication Data

US 2025/0092959 A1 Mar. 20, 2025

Related U.S. Application Data

(60) Provisional application No. 63/539,021, filed on Sep. 18, 2023.

(51) Int. Cl.
*A47C 27/08* (2006.01)
*F16K 31/06* (2006.01)

(52) U.S. Cl.
CPC ............ *F16K 31/06* (2013.01); *A47C 27/082* (2013.01)

(58) Field of Classification Search
CPC ..... A47C 27/082; A47C 27/083; A47C 27/10; A47C 27/081; A47C 31/123; A47C 27/088; A47C 27/08; A47C 21/04; A47C 19/025; A47C 27/002; A47C 20/048; A47C 20/08; A47C 20/04; A47C 27/18; A47C 20/041; A47C 31/008; F16K 31/0655; F16K 31/0627; F16K 31/0606; F16K 31/0658; F16K 31/0696; F16K 27/029; F16K 31/0651; F16K 31/0675;

F16K 31/082; F16K 31/0693; F16K 31/0624; Y10T 137/86686; Y10T 137/86622; Y10T 137/86895; Y10T 137/87917; Y10T 137/5987; Y10T 137/86614; Y10T 137/0491; F02M 25/0836;
(Continued)

(56) References Cited

U.S. PATENT DOCUMENTS

| | | | |
|---|---|---|---|
| 1,804,462 A | 5/1931 | Eggleston |
| 1,978,737 A | 10/1934 | Bower |

(Continued)

FOREIGN PATENT DOCUMENTS

| | | |
|---|---|---|
| EP | 0168213 | 1/1986 |
| KR | 101628052 | 6/2016 |

(Continued)

OTHER PUBLICATIONS

U.S. Appl. No. 09/471,592, Shafer, filed Dec. 23, 1999.
(Continued)

*Primary Examiner* — Madison Matthews
(74) *Attorney, Agent, or Firm* — Norton Rose Fulbright US LUP

(57) ABSTRACT

A valve can include a solenoid coil, a plunger having a core configured to respond to a magnetic field generated by the solenoid coil, and a valve disc. The valve disc can be positioned at a head of the core and configured to cushion impact when the valve is closed. A bumper can be positioned and configured to cushion impact when the valve is opened. The valve can be used in an air bed system in fluid connection between an air pump and an inflatable air chamber of a mattress.

20 Claims, 12 Drawing Sheets

(58) Field of Classification Search
CPC .............. F02M 2025/0845; F02M 1/00; H01F
7/1607; H01F 7/122; H01F 7/088; H01F
7/081; A61B 5/6892; A61B 5/1115; A61G
7/05769; A61G 7/05776; A61G 2203/34;
F23N 1/005; F23N 2235/14; F23N
2235/16; F04D 25/084; Y10S 5/935;
Y10S 297/03
USPC ...... 251/129.15, 129.21, 129.05, 64, 129.17,
251/129.01, 129.18, 129.19, 129.02;
5/713, 706, 710, 711, 615, 618, 655.3,
5/654, 613, 739, 715, 617, 616, 201, 935,
5/400; 137/625.65, 625.5, 625.27;
335/257, 255, 251, 245, 261
See application file for complete search history.

(56) References Cited

U.S. PATENT DOCUMENTS

| | | | |
|---|---|---|---|
| 2,353,835 A | 7/1944 | Lane | |
| 2,363,073 A | 11/1944 | Mantz | |
| 2,569,751 A | 10/1951 | Dube | |
| 2,614,584 A | 10/1952 | Goepfrich | |
| 2,616,452 A | 11/1952 | Clay | |
| 2,624,585 A | 1/1953 | Churchill et al. | |
| 2,685,906 A | 8/1954 | Williams | |
| 2,799,293 A | 7/1957 | Clay | |
| 2,812,776 A | 11/1957 | Lofftus | |
| 2,842,400 A | 7/1958 | Boothjack | |
| 2,861,594 A | 11/1958 | Collins | |
| 2,886,063 A | 5/1959 | Ray | |
| 2,888,233 A | 5/1959 | Windsor | |
| 2,998,817 A | 9/1961 | Armstrong | |
| 2,999,192 A | 9/1961 | Lambert | |
| 3,013,768 A | 12/1961 | La Mastra | |
| 3,022,799 A | 2/1962 | Padula | |
| 3,073,345 A | 1/1963 | Hagler | |
| 3,134,932 A | 5/1964 | Ray | |
| 3,155,367 A | 11/1964 | Gifford | |
| 3,171,439 A | 3/1965 | Lansky | |
| 3,176,954 A | 4/1965 | Cameron | |
| 3,185,177 A | 5/1965 | Brandenberg | |
| 3,203,447 A | 8/1965 | Bremner | |
| 3,232,312 A | 2/1966 | Lansky | |
| 3,263,959 A | 8/1966 | Wisniewski | |
| 3,285,616 A | 11/1966 | Doutt | |
| 3,295,079 A | 12/1966 | Brown | |
| 3,324,889 A | 6/1967 | Batts | |
| 3,429,552 A | 2/1969 | Erickson | |
| 3,446,473 A | 5/1969 | Barker | |
| 3,459,404 A | 8/1969 | Wisniewski | |
| 3,484,076 A | 12/1969 | Naumann | |
| 3,513,876 A | 5/1970 | Tarbox | |
| 3,521,851 A | 7/1970 | Sorrow | |
| 3,552,436 A | 1/1971 | Stewart | |
| 3,608,585 A | 9/1971 | Huntington | |
| 3,630,482 A | 12/1971 | Beller | |
| 3,650,573 A | 3/1972 | Inada | |
| 3,670,274 A | 6/1972 | Ellison | |
| 3,733,047 A | 5/1973 | Allen | |
| 3,750,693 A | 8/1973 | Hardison | |
| 3,784,154 A | 1/1974 | Ostrowski | |
| 3,784,994 A | 1/1974 | Kery | |
| 3,799,570 A | 3/1974 | Giordano | |
| 3,840,959 A | 10/1974 | Allen | |
| 3,872,878 A | 3/1975 | Kozel | |
| 3,913,460 A * | 10/1975 | Wright | F16J 10/02 |
| | | | 277/916 |
| 3,951,378 A | 4/1976 | Manor | |
| 3,977,734 A | 8/1976 | Ronnhult | |
| 4,020,814 A | 5/1977 | Hewitt | |
| 4,057,300 A | 11/1977 | Michellone | |
| 4,065,096 A | 12/1977 | Frantz | |
| 4,102,526 A | 7/1978 | Hargraves | |
| 4,130,188 A | 12/1978 | Askew | |
| 4,132,237 A | 1/1979 | Kennedy | |
| 4,159,026 A | 6/1979 | Williamson | |
| 4,167,200 A | 9/1979 | Bouteille | |
| 4,270,504 A | 6/1981 | Sciotti et al. | |
| 4,322,057 A | 3/1982 | Yamanaka | |
| 4,326,696 A | 4/1982 | Ishikawa | |
| 4,336,920 A | 6/1982 | Murray | |
| 4,341,241 A | 7/1982 | Baker | |
| 4,403,765 A | 9/1983 | Fisher | |
| 4,417,717 A | 11/1983 | Moller | |
| 4,424,830 A | 1/1984 | Arnsperger | |
| 4,427,022 A | 1/1984 | Forney | |
| 4,432,391 A | 2/1984 | Ott | |
| 4,491,157 A | 1/1985 | Hashimoto | |
| 4,522,372 A | 6/1985 | Yano | |
| 4,527,298 A | 7/1985 | Moulton | |
| 4,531,547 A | 7/1985 | Hadden | |
| 4,531,708 A | 7/1985 | Livet | |
| 4,538,129 A | 8/1985 | Fisher | |
| 4,548,389 A | 10/1985 | Smith | |
| 4,582,294 A | 4/1986 | Fargo | |
| 4,583,566 A | 4/1986 | Kalavitz et al. | |
| 4,598,736 A | 7/1986 | Chorkey | |
| 4,606,199 A | 8/1986 | Gotzenberger | |
| 4,624,282 A | 11/1986 | Fargo | |
| 4,644,597 A | 2/1987 | Walker | |
| 4,647,011 A | 3/1987 | Contzen | |
| 4,651,971 A | 3/1987 | Donahue, Jr. | |
| 4,681,142 A | 7/1987 | Woeller | |
| 4,718,448 A | 1/1988 | Love | |
| 4,720,078 A | 1/1988 | Nakamura | |
| 4,728,916 A | 3/1988 | Fontecchio | |
| 4,745,647 A | 5/1988 | Goodwin | |
| 4,753,416 A | 6/1988 | Inagaki | |
| 4,766,628 A | 8/1988 | Walker | |
| 4,788,729 A | 12/1988 | Walker | |
| 4,790,352 A | 12/1988 | Dietiker | |
| 4,797,962 A | 1/1989 | Goode | |
| D300,194 S | 3/1989 | Walker | |
| 4,829,616 A * | 5/1989 | Walker | F04D 25/084 |
| | | | 251/129.05 |
| 4,830,333 A | 5/1989 | Watson | |
| 4,832,582 A | 5/1989 | Buffet | |
| 4,858,886 A | 8/1989 | Tatara | |
| 4,862,921 A | 9/1989 | Hess | |
| 4,890,344 A | 1/1990 | Walker | |
| 4,897,890 A | 2/1990 | Walker | |
| 4,901,702 A | 2/1990 | Beicht | |
| 4,901,974 A | 2/1990 | Cook | |
| 4,908,895 A | 3/1990 | Walker | |
| 4,910,487 A | 3/1990 | Kleinhappl | |
| 4,915,124 A | 4/1990 | Sember, III | |
| 4,921,011 A | 5/1990 | Kelly | |
| 4,936,339 A | 6/1990 | Bennett | |
| 4,944,276 A | 7/1990 | House | |
| 4,945,588 A | 8/1990 | Cassidy et al. | |
| 4,961,561 A | 10/1990 | Kamibayasi | |
| 4,967,786 A | 11/1990 | DuHack | |
| D313,973 S | 1/1991 | Walker | |
| 4,991,244 A | 2/1991 | Walker | |
| 5,003,654 A | 4/1991 | Vrzalik | |
| 5,010,923 A | 4/1991 | Kouda | |
| 5,032,812 A | 7/1991 | Banick | |
| 5,069,188 A | 12/1991 | Cook | |
| 5,083,546 A | 1/1992 | Detweiler | |
| 5,088,520 A | 2/1992 | Haynes | |
| 5,095,568 A | 3/1992 | Thomas et al. | |
| 5,118,072 A | 6/1992 | Sakamoto | |
| 5,127,624 A | 7/1992 | Domke | |
| 5,142,717 A | 9/1992 | Everard et al. | |
| 5,144,706 A | 9/1992 | Walker | |
| 5,152,319 A | 10/1992 | Hannagan et al. | |
| 5,170,364 A | 12/1992 | Gross et al. | |
| 5,170,522 A | 12/1992 | Walker | |
| 5,183,022 A | 2/1993 | Cook | |
| 5,193,986 A | 3/1993 | Grant et al. | |
| 5,199,456 A | 4/1993 | Love et al. | |
| 5,232,353 A | 8/1993 | Grant | |
| 5,235,713 A | 8/1993 | Guthrie et al. | |

(56)                    References Cited

U.S. PATENT DOCUMENTS

| | | |
|---|---|---|
| 5,237,980 A | 8/1993 | Gillier |
| 5,246,199 A | 9/1993 | Numoto |
| 5,289,841 A | 3/1994 | Maranzano |
| 5,303,012 A | 4/1994 | Horlacher |
| 5,325,551 A | 7/1994 | Tappel et al. |
| 5,325,838 A | 7/1994 | Bennett |
| 5,326,070 A | 7/1994 | Baron |
| 5,333,643 A | 8/1994 | Gilchrist |
| 5,345,629 A | 9/1994 | Ferrand |
| 5,379,794 A | 1/1995 | Brown |
| 5,413,141 A | 5/1995 | Dietiker |
| 5,425,147 A | 6/1995 | Supplee et al. |
| 5,447,287 A | 9/1995 | Kelly |
| 5,454,399 A | 10/1995 | Kazakis |
| 5,467,961 A | 11/1995 | Sausner |
| D368,475 S | 4/1996 | Scott |
| 5,503,366 A | 4/1996 | Zabeck |
| 5,509,154 A | 4/1996 | Shafer et al. |
| 5,509,155 A | 4/1996 | Zigarac et al. |
| 5,538,219 A | 7/1996 | Osterbrink |
| 5,542,136 A | 8/1996 | Tappel |
| 5,553,829 A | 9/1996 | Hemsen |
| 5,564,140 A | 10/1996 | Shoenhair et al. |
| 5,565,832 A | 10/1996 | Haller |
| 5,579,741 A | 12/1996 | Cook et al. |
| 5,586,347 A | 12/1996 | Frischknecht |
| 5,594,963 A | 1/1997 | Berkowitz |
| 5,642,546 A | 7/1997 | Shoenhair |
| 5,649,687 A | 7/1997 | Rosas |
| 5,652,484 A | 7/1997 | Shafer et al. |
| 5,655,746 A | 8/1997 | Goubely |
| 5,704,395 A | 1/1998 | Kim |
| 5,709,370 A | 1/1998 | Kah, Jr. |
| 5,765,246 A | 6/1998 | Shoenhair |
| 5,775,670 A | 7/1998 | Osterbrink |
| 5,794,288 A | 8/1998 | Soltani et al. |
| 5,815,864 A | 10/1998 | Sloop |
| 5,903,941 A | 5/1999 | Shafer et al. |
| 5,904,172 A | 5/1999 | Gifft et al. |
| 5,937,884 A | 8/1999 | Barnoin |
| 5,947,239 A | 9/1999 | Koelzer |
| 5,947,442 A | 9/1999 | Shurman |
| 5,967,487 A | 10/1999 | Cook |
| 5,991,949 A | 11/1999 | Miller, Sr. et al. |
| 5,992,461 A | 11/1999 | Gilmore |
| 6,003,839 A | 12/1999 | Kobayashi |
| 6,019,344 A | 2/2000 | Engel |
| 6,037,723 A | 3/2000 | Shafer et al. |
| 6,047,718 A | 4/2000 | Kansky |
| 6,050,542 A | 4/2000 | Johnson |
| 6,065,734 A | 5/2000 | Tackett |
| 6,070,606 A | 6/2000 | Swanson |
| 6,076,550 A | 6/2000 | Hiraishi |
| 6,076,801 A | 6/2000 | DuHack |
| 6,086,042 A | 7/2000 | Scott |
| 6,092,249 A | 7/2000 | Kamen et al. |
| 6,105,616 A | 8/2000 | Sturman |
| 6,108,844 A | 8/2000 | Kraft et al. |
| 6,144,275 A | 11/2000 | Hirata |
| 6,161,231 A | 12/2000 | Kraft et al. |
| 6,193,212 B1 | 2/2001 | Ohmi |
| 6,202,239 B1 | 3/2001 | Ward et al. |
| 6,202,672 B1 | 3/2001 | Ellis et al. |
| 6,213,572 B1 | 4/2001 | Linkner, Jr |
| 6,219,903 B1 | 4/2001 | Osterhart |
| 6,225,886 B1 | 5/2001 | Kleinert |
| 6,231,321 B1 | 5/2001 | Fukudome |
| 6,263,908 B1 | 7/2001 | Love |
| 6,293,516 B1 | 9/2001 | Parsons |
| 6,305,662 B1 | 10/2001 | Parsons |
| 6,347,616 B1 | 2/2002 | Rodriguez |
| 6,397,419 B1 | 6/2002 | Mechache |
| 6,405,757 B1 | 6/2002 | Jabcon |
| 6,422,258 B1 | 7/2002 | DuHack |
| 6,425,409 B1 | 7/2002 | Cross |
| 6,450,590 B1 | 9/2002 | Leventhal |
| 6,453,930 B1 | 9/2002 | Linkner, Jr. |
| 6,463,951 B2 | 10/2002 | Shost |
| 6,467,495 B2 | 10/2002 | Shost |
| 6,483,264 B1 | 11/2002 | Shafer et al. |
| 6,572,077 B1 | 6/2003 | Juergen |
| 6,595,485 B2 | 7/2003 | Burrola |
| 6,666,192 B2 | 12/2003 | Rodriguez |
| 6,686,711 B2 | 2/2004 | Rose et al. |
| 6,708,357 B2 | 3/2004 | Gaboury et al. |
| 6,722,626 B2 | 4/2004 | Balsdon |
| 6,739,573 B1 | 5/2004 | Balsdon |
| 6,763,541 B2 | 7/2004 | Mahoney et al. |
| 6,766,819 B2 | 7/2004 | Shost |
| 6,804,848 B1 | 10/2004 | Rose |
| 6,805,331 B2 | 10/2004 | Burrola |
| 6,830,232 B2 | 12/2004 | Burrola |
| 6,832,397 B2 | 12/2004 | Gaboury et al. |
| 6,840,504 B2 | 1/2005 | Hagiwara et al. |
| D502,929 S | 3/2005 | Copeland et al. |
| 6,883,191 B2 | 4/2005 | Gaboury et al. |
| 6,899,118 B1 | 5/2005 | Pumm |
| 6,935,612 B2 | 8/2005 | McCombs |
| 6,948,697 B2 | 9/2005 | Herbert |
| 6,955,337 B2 | 10/2005 | Weber |
| 7,146,824 B2 | 12/2006 | Ohno |
| 7,159,840 B2 | 1/2007 | Young et al. |
| 7,261,121 B2 | 8/2007 | Bordonaro |
| 7,261,122 B2 | 8/2007 | Bordonaro |
| 7,367,636 B2 | 5/2008 | Ho |
| 7,389,554 B1 | 6/2008 | Rose |
| 7,401,762 B2 | 7/2008 | Ohmori et al. |
| 7,503,346 B1 | 3/2009 | Clark |
| 7,748,684 B2 | 7/2010 | Ito |
| 7,815,164 B2 | 10/2010 | Dong |
| 7,865,988 B2 | 1/2011 | Koughan et al. |
| 7,918,434 B2 | 4/2011 | Petersen |
| 8,104,510 B2 | 1/2012 | Ams |
| 8,172,197 B2 | 5/2012 | Gu |
| 8,186,370 B2 | 5/2012 | Cloud |
| 8,235,064 B2 | 8/2012 | Kasprzyk |
| 8,282,452 B2 | 10/2012 | Grigsby et al. |
| 8,297,314 B2 | 10/2012 | Clark et al. |
| 8,336,369 B2 | 12/2012 | Mahoney |
| 8,393,346 B2 | 3/2013 | Curtis |
| 8,444,558 B2 | 5/2013 | Young et al. |
| 8,506,290 B2 | 8/2013 | Deng |
| D691,118 S | 10/2013 | Ingham et al. |
| 8,550,112 B2 | 10/2013 | Bertelli |
| 8,561,644 B2 | 10/2013 | Schultz |
| 8,576,032 B2 | 11/2013 | Herbert |
| D697,874 S | 1/2014 | Stusynski et al. |
| D698,338 S | 1/2014 | Ingham et al. |
| D701,536 S | 3/2014 | Shakal et al. |
| 8,672,421 B2 | 3/2014 | Eidenschink |
| 8,672,853 B2 | 3/2014 | Young |
| 8,746,275 B2 | 6/2014 | Santinanavat |
| 8,752,541 B2 | 6/2014 | Deng |
| 8,769,747 B2 | 7/2014 | Mahoney et al. |
| 8,814,131 B2 | 8/2014 | Lee |
| 8,832,886 B2 | 9/2014 | Riley et al. |
| 8,893,339 B2 | 11/2014 | Fleury et al. |
| 8,931,329 B2 | 1/2015 | Mahoney et al. |
| 8,960,638 B2 | 2/2015 | Da Pont et al. |
| 8,966,689 B2 | 3/2015 | McGuire et al. |
| 8,973,183 B1 | 3/2015 | Palashewski et al. |
| 8,984,687 B2 | 3/2015 | Stusynski et al. |
| 9,004,447 B2 | 4/2015 | Tung et al. |
| D728,254 S | 5/2015 | Blazar et al. |
| D737,250 S | 8/2015 | Ingham et al. |
| 9,131,781 B2 | 9/2015 | Zaiss et al. |
| 9,140,451 B2 | 9/2015 | Haedicke et al. |
| 9,314,118 B2 | 4/2016 | Blazar et al. |
| 9,353,886 B2 | 5/2016 | Tung |
| 9,370,457 B2 | 6/2016 | Nunn et al. |
| 9,392,879 B2 | 7/2016 | Nunn et al. |
| 9,458,612 B2 | 10/2016 | Thomas et al. |
| 9,488,097 B2 | 11/2016 | Steinman |
| 9,506,569 B2 | 11/2016 | Moren |

(56) References Cited

U.S. PATENT DOCUMENTS

| | | | |
|---|---|---|---|
| 9,510,688 | B2 | 12/2016 | Nunn et al. |
| 9,578,941 | B2 | 2/2017 | MacLachlan et al. |
| 9,599,232 | B2 | 3/2017 | Yoshimura |
| 9,637,099 | B2 | 5/2017 | Eidenschink |
| 9,677,683 | B2 | 6/2017 | Hermansson |
| 9,695,954 | B2 | 7/2017 | Pont et al. |
| 9,730,524 | B2 | 8/2017 | Chen et al. |
| 9,737,154 | B2 | 8/2017 | Mahoney et al. |
| 9,770,114 | B2 | 9/2017 | Brosnan et al. |
| D809,843 | S | 2/2018 | Keeley et al. |
| D812,393 | S | 3/2018 | Karschnik et al. |
| 9,924,813 | B1 | 3/2018 | Basten et al. |
| 9,982,797 | B2 | 5/2018 | Ye |
| 10,100,945 | B2 | 10/2018 | Dong |
| 10,143,312 | B2 | 12/2018 | Brosnan et al. |
| 10,149,549 | B2 | 12/2018 | Erko et al. |
| 10,152,065 | B2 | 12/2018 | Ok |
| D840,732 | S | 2/2019 | Peterson et al. |
| 10,194,753 | B2 | 2/2019 | Fleury et al. |
| 10,242,786 | B2 | 3/2019 | Raff |
| 10,285,508 | B2 | 5/2019 | Rose et al. |
| 10,342,358 | B1 | 7/2019 | Palashewski et al. |
| D857,433 | S | 8/2019 | Kiekhoefer et al. |
| 10,408,361 | B2 | 9/2019 | Jin |
| 10,422,432 | B2 | 9/2019 | Kuzuya |
| 10,458,366 | B2 | 10/2019 | Brock |
| 10,531,745 | B2 | 1/2020 | McGuire et al. |
| 10,539,170 | B2 | 1/2020 | Peterson et al. |
| 10,575,654 | B2 | 3/2020 | Shakal |
| 10,619,755 | B2 | 4/2020 | Carlson |
| 10,626,996 | B2 | 4/2020 | Voss |
| 10,674,832 | B2 | 6/2020 | Brosnan et al. |
| 10,677,232 | B2 | 6/2020 | Shakal et al. |
| 10,729,253 | B1 | 8/2020 | Gaunt |
| 10,765,224 | B2 | 9/2020 | Chen et al. |
| 10,772,438 | B2 | 9/2020 | Griffith et al. |
| 10,813,470 | B2 | 10/2020 | Mahoney et al. |
| 10,827,846 | B2 | 11/2020 | Karschnik et al. |
| 10,830,371 | B2 | 11/2020 | Raff et al. |
| 10,888,173 | B2 | 1/2021 | Shakal et al. |
| 10,993,546 | B2 | 5/2021 | Shakal et al. |
| 11,001,447 | B2 | 5/2021 | Shutes et al. |
| 11,085,479 | B2 | 8/2021 | Griffith et al. |
| 11,096,502 | B2 | 8/2021 | Rose et al. |
| D932,808 | S | 10/2021 | Keeley |
| 11,140,999 | B2 | 10/2021 | Peterson et al. |
| 11,229,297 | B2 | 1/2022 | Gaunt |
| 11,484,128 | B2 | 11/2022 | Stusynski et al. |
| 11,612,257 | B2 | 3/2023 | Yen et al. |
| D982,360 | S | 4/2023 | Negus |
| 11,950,702 | B2 | 4/2024 | Shakal et al. |
| D1,032,243 | S | 6/2024 | Negus et al. |
| 2001/0037832 | A1 | 11/2001 | Weiss |
| 2002/0023681 | A1 | 2/2002 | Ellis et al. |
| 2002/0069462 | A1 | 6/2002 | Gaboury et al. |
| 2002/0125451 | A1 | 9/2002 | Ben-Asher |
| 2004/0069355 | A1 | 4/2004 | Sollier |
| 2004/0195537 | A1 | 10/2004 | Weber et al. |
| 2004/0232372 | A1 | 11/2004 | Mccombs |
| 2005/0044631 | A1 | 3/2005 | Wang |
| 2005/0045844 | A1 | 3/2005 | Burrola |
| 2005/0166979 | A1 | 8/2005 | Berger |
| 2005/0204475 | A1 | 9/2005 | Schmitz et al. |
| 2005/0235417 | A1 | 10/2005 | Koughan et al. |
| 2007/0069166 | A1 | 3/2007 | Sisk |
| 2007/0251588 | A1 | 11/2007 | Linder |
| 2008/0047618 | A1 | 2/2008 | Ishikawa |
| 2008/0052830 | A1 | 3/2008 | Koughan et al. |
| 2008/0077020 | A1 | 3/2008 | Young et al. |
| 2008/0203339 | A1 | 8/2008 | Kato |
| 2008/0210897 | A1 | 9/2008 | Wagner |
| 2008/0272208 | A1 | 11/2008 | Anderson |
| 2009/0039302 | A1 | 2/2009 | Giacomini |
| 2009/0094740 | A1 | 4/2009 | Ji |
| 2010/0043148 | A1 | 2/2010 | Rose et al. |
| 2010/0108927 | A1* | 5/2010 | Perz .................. F16K 31/0696 251/129.15 |
| 2010/0282988 | A1 | 11/2010 | Kasprzyk |
| 2011/0094040 | A1 | 4/2011 | DeGreef |
| 2011/0095216 | A1 | 4/2011 | DeGreef |
| 2011/0144455 | A1 | 6/2011 | Young et al. |
| 2012/0318242 | A1 | 12/2012 | Roh et al. |
| 2013/0168584 | A1 | 7/2013 | Tung |
| 2014/0182061 | A1 | 7/2014 | Zaiss |
| 2014/0191549 | A1 | 7/2014 | Hermansson |
| 2014/0246615 | A1 | 9/2014 | Volz |
| 2014/0250597 | A1 | 9/2014 | Chen et al. |
| 2014/0257571 | A1 | 9/2014 | Chen et al. |
| 2014/0259417 | A1 | 9/2014 | Nunn et al. |
| 2014/0259418 | A1 | 9/2014 | Nunn et al. |
| 2014/0259431 | A1 | 9/2014 | Fleury |
| 2014/0259433 | A1 | 9/2014 | Nunn et al. |
| 2014/0259434 | A1 | 9/2014 | Nunn et al. |
| 2014/0277611 | A1 | 9/2014 | Nunn et al. |
| 2014/0277778 | A1 | 9/2014 | Nunn et al. |
| 2014/0277822 | A1 | 9/2014 | Nunn et al. |
| 2015/0007393 | A1 | 1/2015 | Palashewski |
| 2015/0025327 | A1 | 1/2015 | Young et al. |
| 2015/0026896 | A1 | 1/2015 | Fleury et al. |
| 2015/0108382 | A1 | 4/2015 | Svensson |
| 2015/0157137 | A1 | 6/2015 | Nunn et al. |
| 2015/0157519 | A1 | 6/2015 | Stusynski et al. |
| 2015/0182033 | A1 | 7/2015 | Brosnan et al. |
| 2015/0182397 | A1 | 7/2015 | Palashewski et al. |
| 2015/0182399 | A1 | 7/2015 | Palashewski et al. |
| 2015/0182418 | A1 | 7/2015 | Zaiss |
| 2015/0290059 | A1 | 10/2015 | Brosnan et al. |
| 2015/0366366 | A1 | 12/2015 | Zaiss et al. |
| 2015/0374137 | A1 | 12/2015 | Mahoney et al. |
| 2016/0061340 | A1 | 3/2016 | Shen |
| 2016/0100696 | A1 | 4/2016 | Palashewski et al. |
| 2016/0192886 | A1 | 7/2016 | Nunn et al. |
| 2016/0242562 | A1 | 8/2016 | Karschnik et al. |
| 2016/0338871 | A1 | 11/2016 | Nunn et al. |
| 2016/0367039 | A1 | 12/2016 | Young et al. |
| 2017/0003666 | A1 | 1/2017 | Nunn et al. |
| 2017/0035212 | A1 | 2/2017 | Nunn et al. |
| 2017/0049243 | A1 | 2/2017 | Nunn et al. |
| 2017/0196369 | A1 | 7/2017 | Nunn et al. |
| 2017/0303697 | A1 | 10/2017 | Chen et al. |
| 2017/0318980 | A1 | 11/2017 | Mahoney et al. |
| 2018/0116418 | A1 | 5/2018 | Shakal et al. |
| 2018/0125259 | A1 | 5/2018 | Peterson et al. |
| 2019/0082855 | A1 | 3/2019 | Brosnan et al. |
| 2019/0346065 | A1 | 11/2019 | Byle |
| 2020/0124759 | A1 | 4/2020 | Sugiura |
| 2020/0132211 | A1 | 4/2020 | Sugiura |
| 2020/0187667 | A1 | 6/2020 | Shakal |
| 2020/0359805 | A1 | 11/2020 | Brosnan et al. |
| 2020/0375369 | A1 | 12/2020 | Negus et al. |
| 2020/0400135 | A1 | 12/2020 | Shakal et al. |
| 2021/0145183 | A1 | 5/2021 | Negus et al. |
| 2021/0145185 | A1 | 5/2021 | Negus et al. |
| 2021/0177155 | A1 | 6/2021 | McGuire et al. |
| 2021/0244196 | A1 | 8/2021 | Hilden et al. |
| 2021/0251392 | A1 | 8/2021 | Shakal |
| 2021/0330090 | A1 | 10/2021 | Shakal et al. |
| 2021/0341006 | A1 | 11/2021 | Griffith et al. |
| 2022/0192388 | A1 | 6/2022 | Smith et al. |
| 2022/0218116 | A1 | 7/2022 | Rose et al. |
| 2022/0273118 | A1 | 9/2022 | Peterson et al. |
| 2022/0322840 | A1 | 10/2022 | Gaunt |
| 2022/0369827 | A1 | 11/2022 | Rose et al. |
| 2023/0017015 | A1 | 1/2023 | Karschnik et al. |
| 2023/0027288 | A1 | 1/2023 | Karschnik |
| 2023/0031563 | A1 | 2/2023 | Molina et al. |
| 2023/0057322 | A1 | 2/2023 | Shakal |
| 2023/0063979 | A1 | 3/2023 | Doffing et al. |
| 2023/0128215 | A1 | 4/2023 | Karschnik et al. |
| 2023/0148764 | A1 | 5/2023 | Negus et al. |
| 2023/0218088 | A1 | 7/2023 | Brosnan et al. |
| 2023/0389717 | A1 | 12/2023 | Yang et al. |
| 2024/0011476 | A1 | 1/2024 | Shakal et al. |
| 2024/0016301 | A1 | 1/2024 | Karschnik et al. |

(56) References Cited

U.S. PATENT DOCUMENTS

| | | |
|---|---|---|
| 2024/0074592 A1 | 3/2024 | Gaunt |
| 2024/0115055 A1 | 4/2024 | Doffing et al. |
| 2024/0115058 A1 | 4/2024 | VerBockel et al. |
| 2024/0148157 A1 | 5/2024 | Stusynski et al. |
| 2024/0251961 A1 | 8/2024 | Shakal et al. |
| 2024/0260762 A1 | 8/2024 | Shakal |
| 2024/0298809 A1 | 9/2024 | Griffith et al. |
| 2024/0315459 A1 | 9/2024 | Smith et al. |
| 2024/0341497 A1 | 10/2024 | Sullivan et al. |
| 2024/0349902 A1 | 10/2024 | Negus et al. |

FOREIGN PATENT DOCUMENTS

| | | | | |
|---|---|---|---|---|
| WO | WO 1997/000634 | 1/1997 | | |
| WO | WO-2018081094 A1 * | 5/2018 | ......... | F16K 31/0624 |

OTHER PUBLICATIONS

U.S. Appl. No. 14/594,843, Rose et al., filed Jan. 12, 2015.
U.S. Appl. No. 18/196,658, Herman et al., filed May 12, 2023.
U.S. Appl. No. 18/799,173, Chellamuthu et al., filed Aug. 9, 2024.
U.S. Appl. No. 18/804,448, Palerm et al., filed Aug. 14, 2024.
U.S. Appl. No. 18/893,828, Gaunt, filed Sep. 23, 2024.
U.S. Appl. No. 18/894,736, Griffith et al., filed Sep. 24, 2024.
U.S. Appl. No. 29/719,090, Negus et al., filed Dec. 31, 2019.
U.S. Appl. No. 29/821,785, Negus et al., filed Jan. 3, 2022.
U.S. Appl. No. 29/942,156, Negus et al., filed May 14, 2024.

* cited by examiner

PLUNGER WITH REAR FACING BUMPER FOR AIR MANIFOLD

TECHNICAL FIELD

This invention relates to valves, and more particularly to plungers of air valves for use in air beds with a rear-facing bumper.

BACKGROUND

People have traditionally used beds that come in many shapes, sizes, and styles. Such beds can range from extremely simple designs to rather complex designs that include a variety of features. For example, some beds can have one or more inflatable air chambers. Some of such beds can include an inflation system including a number of mechanical and electrical components. For example, some beds can include one or more pumps with one or more valves for inflating the air chambers.

SUMMARY

Some embodiments of a pump system can include one or more of the features and functions disclosed herein. Some embodiments can include a solenoid valve with one or more means for reducing noise during actuation of the valve. A projection can be positioned to cushion impact when the valve is opened. The valve can have a plunger with a core having a head connected to a forward-facing valve disc in a manner that is configured to dampen impact when the valve closes in a forward-facing direction and impacts the valve seat, thus reducing sound. A chamfered or rounded head can interact with the valve seat in a way that allows the valve head to bulge when closed, dampening impact, and also creating an air gap that (along with elastomer material of the valve disc) acts as a dampened spring. The plunger can have a rear-facing bumper connected in a manner that is configured to dampen impact when the valve opens in a rear-facing direction opposite the forward-facing direction, thus reducing sound. This can be particularly desirable in inflatable air beds where noise can be undesirable, especially during sleep of a user. Various embodiments can be configured with components having particular shapes and features.

In one aspect, a valve can include a solenoid coil, a plunger having a core configured to respond to a magnetic field generated by the solenoid coil, and a valve disc. The valve disc can be positioned at a head of the core and configured to cushion impact when the valve is closed. A projection can be positioned and configured to cushion impact when the valve is opened. The valve can be used in an air bed system in fluid connection between an air pump and an inflatable air chamber of a mattress.

Some of the implementations described herein may optionally include one or more of the following features. The valve disc defines a receptacle, the head of the core is positioned in the receptacle, and a front surface of the head of the core and an opposing surface in the receptacle of the valve disc are shaped to space at least part of the front surface from the opposing surface. The head of the core comprises a chamfered front surface. The head of the core abuts an opposing surface of the valve disc at a center of the head and is spaced from the opposing surface near a rim of the head. The projection is a bumper extending from a tail end of the core. The projection is a nub extending from the valve disc in a direction opposite of a forward-facing face of the valve disc. The valve further includes a core tube, a core spring, a seal insert, and a valve seat. The core spring is positioned between the seal insert and the core so as to bias the core away from the seal insert such that the valve disc contacts the valve seat when the solenoid is not energized. The valve is configured such that the core spring is compressed until the projection abuts a stop when the solenoid is energized. The valve comprises a valve seat having a diameter larger than that of the head of the core and less than that of the valve disc. The valve is configured such that the valve disc bulges into a hole defined by the valve seat when the valve is closed. A circumferential edge of the valve seat has a radius of between 0.030 and 0.200 millimeters and wherein the valve disc contacts the circumferential edge when the valve is closed. The core defines a receptacle at the tail end of the core opposite the valve disc and the projection comprises a bumper positioned partially in the receptacle and extending from the tail end of the core. The valve disc comprises a first elastomer and the projection comprises a second elastomer different than the first elastomer. The air bed further includes means for quieting impact of the valve disc when the valve is closed.

In another aspect, a valve includes a solenoid coil, a plunger having a core configured to respond to a magnetic field generated by the solenoid coil, and a valve disc positioned at a head of the core and configured to cushion impact when the valve is closed. A projection is positioned and configured to cushion impact when the valve is opened.

Some of the implementations described herein may optionally include one or more of the following features. The valve disc defines a receptacle and a proximal face having a sealing surface, the head of the core is positioned in the receptacle, and a front surface of the head of the core and an opposing surface in the receptacle of the valve disc are shaped to space at least part of the front surface from the opposing surface. The head of the core includes a chamfered front surface such that a center of the head of the core abuts an opposing surface of the valve disc and an outer portion of the head is spaced from the opposing surface of the valve disc. The valve comprises a valve seat having a diameter larger than that of the head of the core and less than that of the valve disc. The core defines a receptacle at the tail end of the core and the projection comprises a bumper positioned partially in the receptacle and extending from the tail end of the core. The valve disc includes a first elastomer configured for dampening and sealing and the projection includes a second elastomer different than the first elastomer.

In another aspect, an air bed system includes a mattress, an air pump, and a valve. The mattress has at least one inflatable air chamber. The valve is in fluid connection between the air pump and the inflatable air chamber so as to selectively regulate fluid communication between the air pump and the inflatable air chamber. The valve includes a solenoid coil, a plunger, a valve disc, and a bumper. The plunger has a core to respond to a magnetic field generated by the solenoid coil. The valve disc is positioned at a head end of the core and cushions impact when the valve is closed. The bumper is positioned at a tail end and cushions impact when the valve is opened. The bumper includes a cavity in a rear-facing surface of the bumper. The cavity extends from the rear-facing surface toward the core.

In another aspect combinable with any other example aspect, the valve disc defines a receptacle. The head end of the core is positioned in the receptacle. A front surface of the head end of the core and an opposing surface in the receptacle of the valve disc are shaped to space at least part of the front surface from the opposing surface.

In another aspect combinable with any other example aspect, the head end of the core includes a chamfered front surface.

In another aspect combinable with any other example aspect, the head end of the core abuts an opposing surface of the valve disc at a center of the head end and is spaced from the opposing surface near a rim of the head end.

In another aspect combinable with any other example aspect, the valve further includes a core tube, a core spring, a seal insert, and a valve seat. The core spring is positioned between the seal insert and the core so as to bias the core away from the seal insert such that the valve disc contacts the valve seat when the solenoid coil is not energized.

In another aspect combinable with any other example aspect, the valve is configured such that the core spring is compressed until the bumper abuts a stop when the solenoid coil is energized.

In another aspect combinable with any other example aspect, the bumper is rear-facing and the valve disc is forward facing.

In another aspect combinable with any other example aspect, the core defines a receptacle at the tail end of the core and the bumper is positioned partially in the receptacle and extending from the tail end of the core.

In another aspect combinable with any other example aspect, the bumper has a body and a head. The body is sized to fit partially in the receptacle. The head extends from the body outside the receptacle.

In another aspect combinable with any other example aspect, the head of the bumper includes a portion defining an outer diameter greater than an outer diameter of the body.

In another aspect combinable with any other example aspect, the head includes a rear-facing surface, and an edge connecting the rear-facing surface to an outer surface defined by the outer diameter is beveled.

In another aspect combinable with any other example aspect, the bumper includes a cavity on a rear-facing surface of the head.

In another aspect combinable with any other example aspect, the cavity is hemispherical.

In another aspect combinable with any other example aspect, the cavity is conical.

In another aspect combinable with any other example aspect, the cavity is frustoconical.

In another aspect combinable with any other example aspect, the cavity is bell-shaped.

In another aspect combinable with any other example aspect, a diameter of the cavity is less than an outer diameter of the body.

In another aspect combinable with any other example aspect, a diameter of the cavity is greater than or equal to an outer diameter of the body.

In another aspect combinable with any other example aspect, the cavity is further defined by a depth from the rear-facing surface of the head.

In another aspect combinable with any other example aspect, the depth of the cavity is less than a height of the head.

In another aspect combinable with any other example aspect, the depth of the cavity is equal to a height of the head.

In another aspect combinable with any other example aspect, the depth of the cavity is greater than a height of the head.

In another aspect combinable with any other example aspect, the depth of the cavity extends from the head into the body.

In another aspect combinable with any other example aspect, the depth of the cavity extends from the head into the body past a rim extending from the body.

In another aspect combinable with any other example aspect, the head includes a channel on a forward-facing surface of the head. The forward-facing surface opposite the rear-facing surface.

In another aspect combinable with any other example aspect, the channel contacts the body.

In another aspect combinable with any other example aspect, a cross-section of the channel is hemispherical.

In another aspect combinable with any other example aspect, the cross-section of the channel further includes a tapered region extending from the hemispherical cross-section toward an outer diameter of the head.

In another aspect combinable with any other example aspect, an outer portion of the rear-facing surface is offset from an inner portion of the rear-facing surface.

In another aspect combinable with any other example aspect, the outer portion of the rear-facing surface is offset from the inner portion of the rear-facing surface in a forward-facing direction.

In another aspect combinable with any other example aspect, the bumper further includes a rim extending radially from an outer surface of the body.

In another aspect combinable with any other example aspect, the rim is sized to fit in a groove of the receptacle, holding the bumper in the receptacle.

In another example aspect, a valve includes a solenoid coil, a plunger, a valve disc, and a bumper. The plunger has a core configured to respond to a magnetic field generated by the solenoid coil. The valve disc is positioned at a head of the core and configured to cushion impact when the valve is closed. The bumper is positioned at a tail of the core opposite the head and configured to cushion impact when the valve is opened. The bumper includes a cavity in a rear-facing surface of the bumper. The cavity extends from the rear-facing surface toward the core.

In another aspect, a solenoid valve includes a plunger. The plunger has a valve core, a valve disc, and an annular bumper. The valve core has a first end and a second end. The valve disc is positioned at the first end of the valve core. The annular bumper is positioned at a second end of the valve core.

In another aspect, a solenoid valve includes a plunger. The plunger has a valve core, a valve disc, and a bumper. The valve core has a first end and a second end. The valve disc is positioned at the first end of the valve core. The bumper has a height greater than a width. The bumper is positioned at a second end of the valve core. The height of the bumper is measured in a direction parallel to a centerline axis of the valve core.

In another aspect, a solenoid valve includes a plunger. The plunger has a valve core, a valve disc, and a bumper. The valve core has a first end and a second end. The valve disc is positioned at the first end of the valve core. The bumper is positioned at a second end of the valve core. The bumper includes a cavity in a rear-facing surface of the bumper. The cavity extends from the rear-facing surface toward the valve core.

In another aspect, a solenoid valve includes a plunger. The plunger has a valve core, a valve disc, and a bumper. The valve core has a first end and a second end. The valve disc is positioned at the first end of the valve core. The bumper is positioned at a second end of the valve core. The bumper includes a cylindrical outer surface adjacent a rear-facing surface at the second end of the valve core, a frustoconical outer surface adjacent the cylindrical outer surface, and an annular inner surface positioned circumferentially inside the frustoconical outer surface.

In another aspect, a solenoid valve includes a plunger. The plunger has a valve core, a valve disc, and a bumper. The valve core has a first end and a second end. The valve disc is positioned at the first end of the valve core. The bumper is positioned at a second end of the valve core. The bumper includes a hemispherical indentation positioned at a center of the bumper.

In another aspect, a solenoid valve includes a plunger. The plunger has a valve core, a valve disc, and a bumper. The valve core has a first end and a second end. The valve disc is positioned at the first end of the valve core. The bumper is positioned at a second end of the valve core. The bumper includes a parabolic indentation positioned at a center of the bumper.

In another aspect, a solenoid valve includes a plunger. The plunger has a valve core, a valve disc, and a bumper. The valve core has a first end and a second end. The valve disc is positioned at the first end of the valve core. The bumper is positioned at a second end of the valve core. The bumper includes a circumferential rim extending circumferentially outward from a centerline axis of the valve core. The circumferential rim is in contact with a rear surface of the valve core at a radially outer portion of the circumferential rim. The circumferential rim is spaced away from the rear surface of the valve core at a portion of the circumferential rim that is spaced radially inward from the radially outer portion.

In another aspect combinable with any other example aspect, the circumferential rim defines a hollow annular space between the circumferential rim and the rear surface of the valve core at the portion of the circumferential rim that is spaced radially inward from the radially outer portion.

In another aspect, a solenoid valve includes a plunger. The plunger has a valve core, a valve disc, and a bumper. The valve core has a first end and a second end. The valve disc is positioned at the first end of the valve core. The bumper is positioned at a second end of the valve core. An inner surface portion of the bumper defines a cavity at a center of the bumper. The inner surface portion of the bumper includes a frustoconical portion, a concave portion, and a convex portion.

The details of one or more embodiments of the invention are set forth in the accompanying drawings and the description below. Other features, objects, and advantages of the invention will be apparent from the description and drawings, and from the claims.

DETAILED DESCRIPTION

An air controller, such as for inflatable air beds, can have a pump and one or more valves. Such a valve can be configured with one or more features configured for reducing noise during operation of the valve by dampening impact when the valve is opened and/or closed. This can be particularly desirable in inflatable air beds where noise can be undesirable, especially during sleep of a user.

Figure 1:
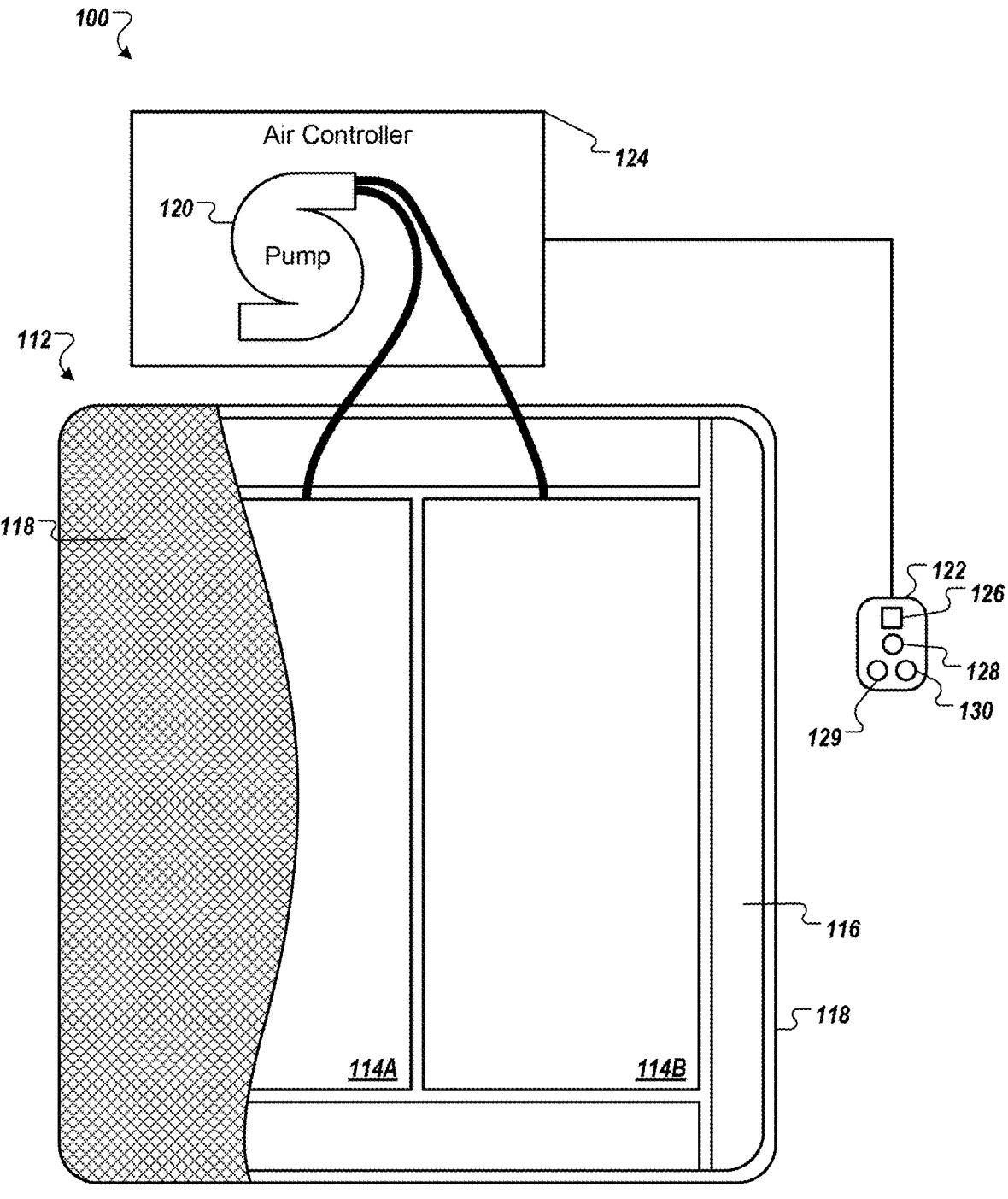
FIG. 1 shows an example air bed system.

FIG. 1 shows an example air bed system 100 that includes a bed 112. The bed 112 includes at least one air chamber 114 surrounded by a resilient border 116 and encapsulated by bed ticking 118. The resilient border 116 can comprise any suitable material, such as foam.

As illustrated in FIG. 1, the bed 112 can be a two chamber design having first and second fluid chambers, such as a first air chamber 114A and a second air chamber 114B. In alternative embodiments, the bed 112 can include chambers for use with fluids other than air that are suitable for the application. In some embodiments, such as single beds or kids' beds, the bed 112 can include a single air chamber 114A or 114B or multiple air chambers 114A and 114B. The first and second air chambers 114A and 114B can be in fluid communication with a pump 120. The pump 120 can be part of an air controller 124, which can be in electrical communication with a remote control 122. The air controller 124 can include a wired or wireless communications interface for communicating with one or more devices, including the remote control 122. The air controller 124 can be configured to operate the pump 120 to cause increases and decreases in the fluid pressure of the first and second air chambers 114A and 114B based upon commands input by a user using the remote control 122. In some implementations, the pump 120 and the air controller 124 can be integrated into a common housing. In other embodiments, the air controller 124 and the pump 120 can be in separate housings.

The remote control 122 can include a display 126, an output selecting mechanism 128, a pressure increase button 129, and a pressure decrease button 130. The output selecting mechanism 128 can allow the user to switch air flow generated by the pump 120 between the first and second air chambers 114A and 114B, thus enabling control of multiple air chambers with a single remote control 122 and a single pump 120. For example, the output selecting mechanism 128 can by a physical control (e.g., switch or button) or an input control displayed on display 126. Alternatively, separate remote control units can be provided for each air chamber and can each include the ability to control multiple air chambers. Pressure increase and decrease buttons 129 and 130 can allow a user to increase or decrease the pressure, respectively, in the air chamber selected with the output selecting mechanism 128. Adjusting the pressure within the selected air chamber can cause a corresponding adjustment to the firmness of the respective air chamber. In some embodiments, the remote control 122 can be omitted or modified as appropriate for an application. For example, in some embodiments the bed 112 can be controlled by a computer, tablet, smart phone, or other device in wired or wireless communication with the bed 112.

Figure 2:
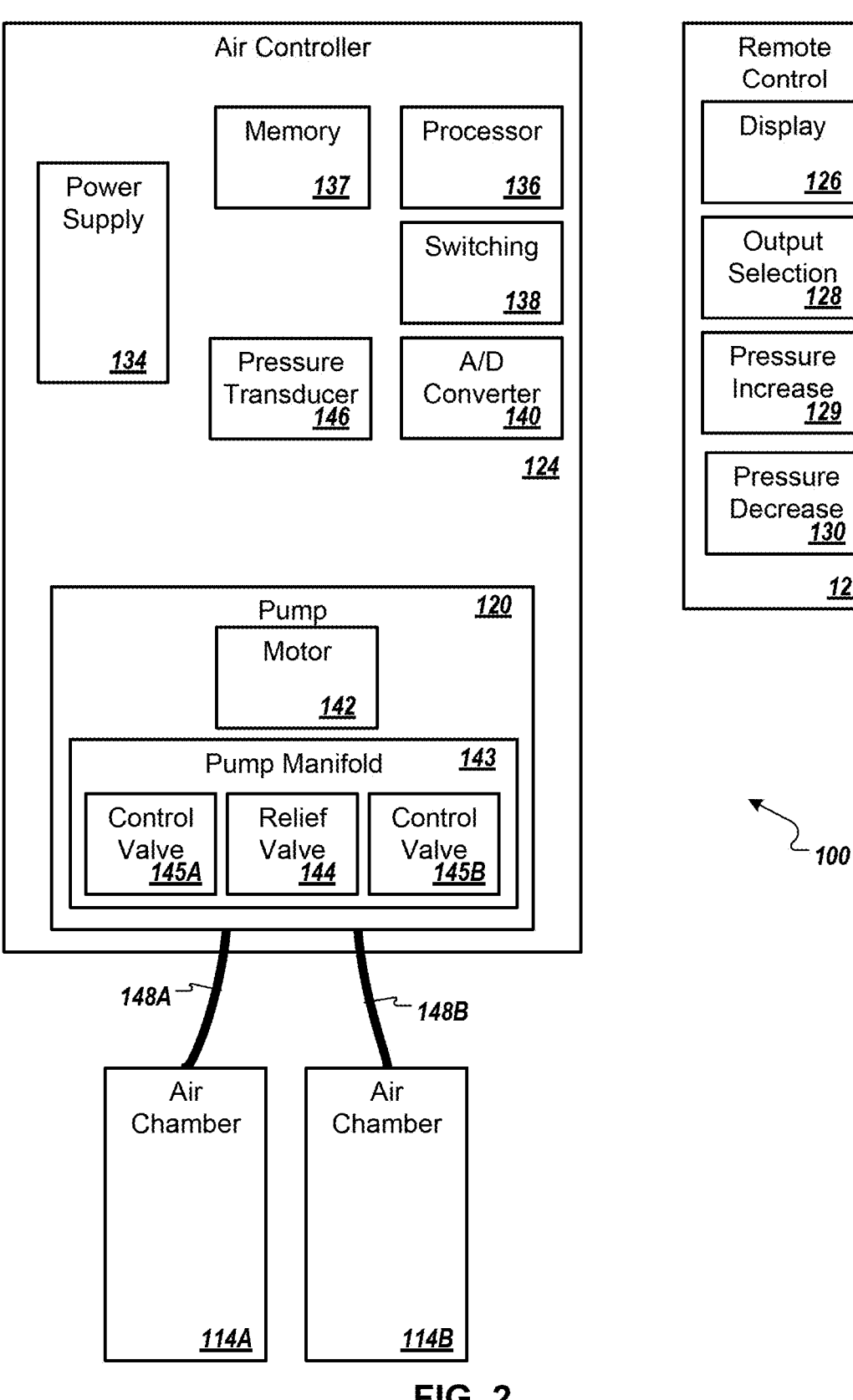
FIG. 2 is a block diagram of an example of various components of an air bed system.

FIG. 2 is a block diagram of an example of various components of an air bed system. For example, these components can be used in the example air bed system 100. As shown in FIG. 2, the air controller 124 can include the pump 120, a power supply 134, a processor 136, a memory 137, a switching mechanism 138, and an analog to digital (A/D) converter 140, an air manifold 143 (having valves 144, 145A, and 145B), and one or more pressure transducers 146. The switching mechanism 138 can be, for example, a relay or a solid state switch.

The pump 120 can include a motor 142. The pump 120 can be fluidly connected to the pump manifold, which is fluidically connected with the first air chamber 114A and the second air chamber 114B via a first tube 148A and a second tube 148B, respectively. The first and second control valves 145A and 145B can be controlled by switching mechanism 138 and are operable to regulate the flow of fluid between the pump 120 and first and second air chambers 114A and 114B, respectively.

In some implementations, the pump 120 and the air controller 124 can be provided and packaged as a single unit. In some alternative implementations, the pump 120 and the air controller 124 can be provided as physically separate units. In some implementations, the air controller 124, the pump 120, or both are integrated within or otherwise contained within a bed frame or bed support structure that supports the bed 112. In some implementations, the air controller 124, the pump 120, or both are located outside of a bed frame or bed support structure (as shown in the example in FIG. 1).

The example air bed system 100 depicted in FIG. 2 includes the two air chambers 114A and 114B and the single pump 120. However, other implementations can include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps can allow each air chamber to be inflated or deflated independently and simultaneously. Furthermore, additional pressure transducers can also be incorporated into the air bed system such that, for example, a separate pressure transducer can be associated with each air chamber.

In use, the processor 136 can, for example, send a decrease pressure command for one of the air chambers 114A or 114B, and the switching mechanism 138 can be used to convert the low voltage command signals sent by the processor 136 to higher operating voltages sufficient to operate the relief valve 144 of the pump 120 and open the control valve 145A or 145B. Opening the relief valve 144 can allow air to escape from the air chamber 114A or 114B through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information useable by the processor 136. The processor 136 can send the digital signal to the remote control 122 to update the display 126 in order to convey the pressure information to the user.

As another example, the processor 136 can send an increase pressure command. The pump motor 142 can be energized in response to the increase pressure command and send air to the designated one of the air chambers 114A or 114B through the air tube 148A or 148B via electronically operating the corresponding valve 145A or 145B. While air is being delivered to the designated air chamber 114A or 114B in order to increase the firmness of the chamber, the pressure transducer 146 can sense pressure within the air manifold 143. Again, the pressure transducer 146 can send pressure readings to the processor 136 via the A/D converter 140. The processor 136 can use the information received from the A/D converter 140 to determine the difference between the actual pressure in air chamber 114A or 114B and the desired pressure. The processor 136 can send the digital signal to the remote control 122 to update display 126 in order to convey the pressure information to the user.

Figure 3:
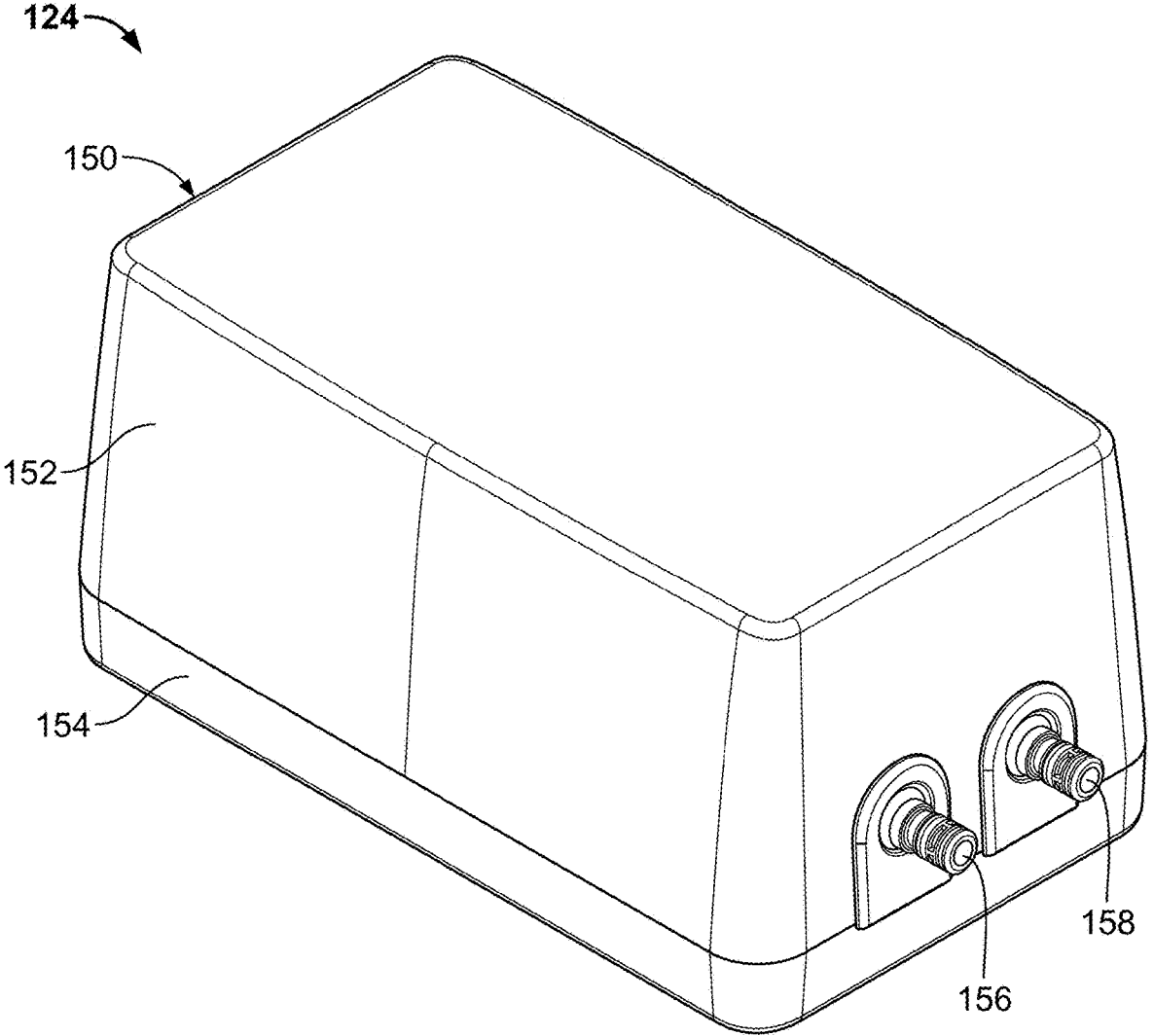
FIG. 3 is a perspective view of an air controller for use in an air bed system.

FIG. 3 is a perspective view of the air controller 124 in a housing 150. The housing 150 can include a housing top 152 and a housing bottom 154 and can substantially enclose components of the air controller 124. One or more nozzles 156 and 158 can extend through the housing 150 and can be detachably connected to the air tubes 148A and 148B (shown in FIG. 2) for inflating the air chambers 114A and 114B (shown in FIG. 2).

Figure 4:
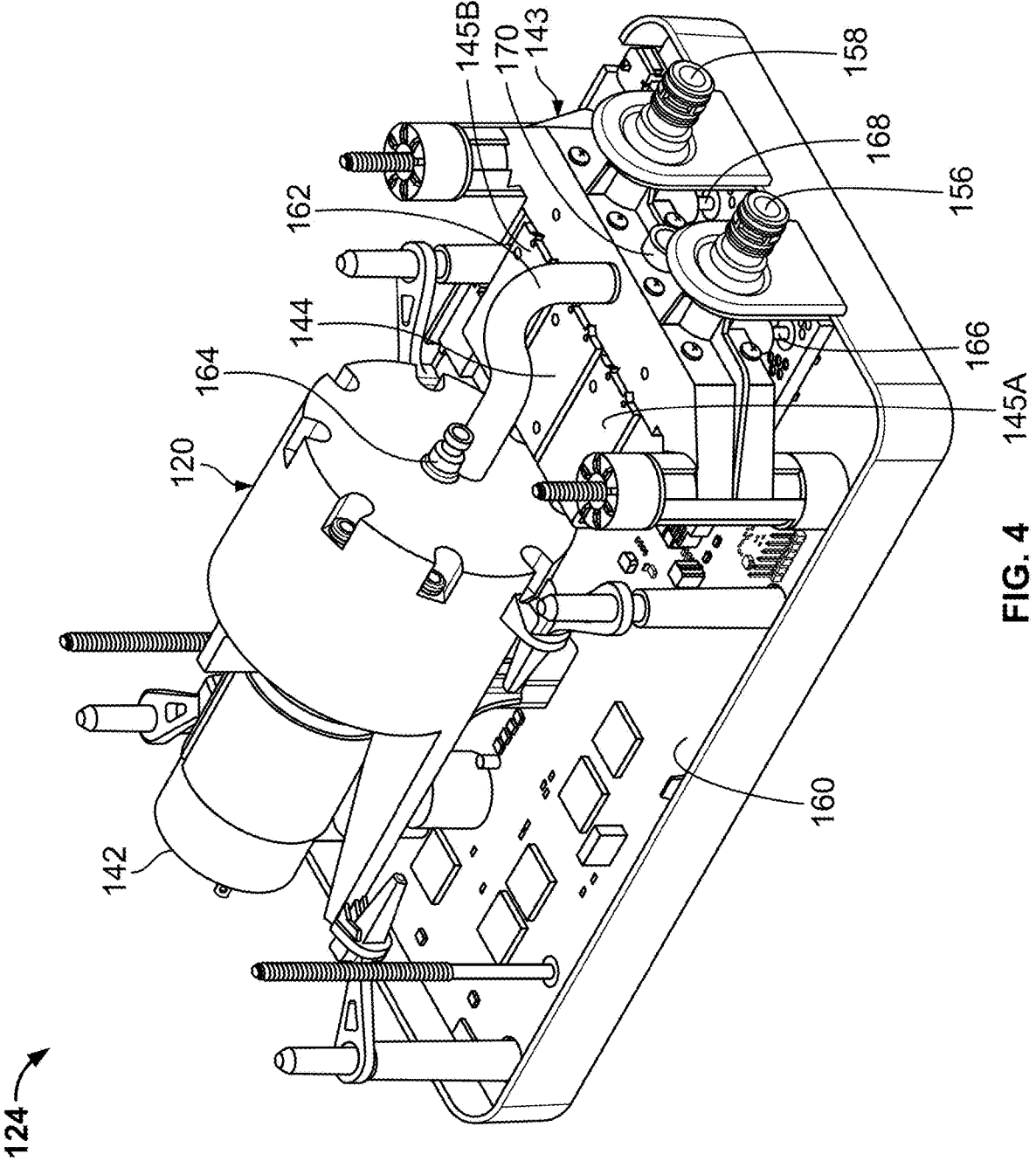
FIG. 4 is a perspective view of the air controller of FIG. 3 with a top of a housing removed.

FIG. 4 is a perspective view of the air controller 124 with the housing top 152 (shown in FIG. 3) removed so as to show internal components. As shown in FIG. 4, the housing 150 of the air controller 124 contains the pump 120 and its motor 142, the air manifold 143, and a printed circuit board 160 (which can include some or all of the power supply 134, the processor 136, the memory 137, the switching mechanism 138, the A/D converter 140, and the pressure transducer 146 shown in FIG. 2).

A tube 162 can extend from a nozzle 164 of the pump 120 to the air manifold 143 for fluidly connecting the pump 120 to the air manifold 143. One or more additional tubes 166 and 168 can extend from the air manifold 143 to one or more pressure transducers 146 (shown in FIG. 2) on the printed circuit board 160.

Figure 5:
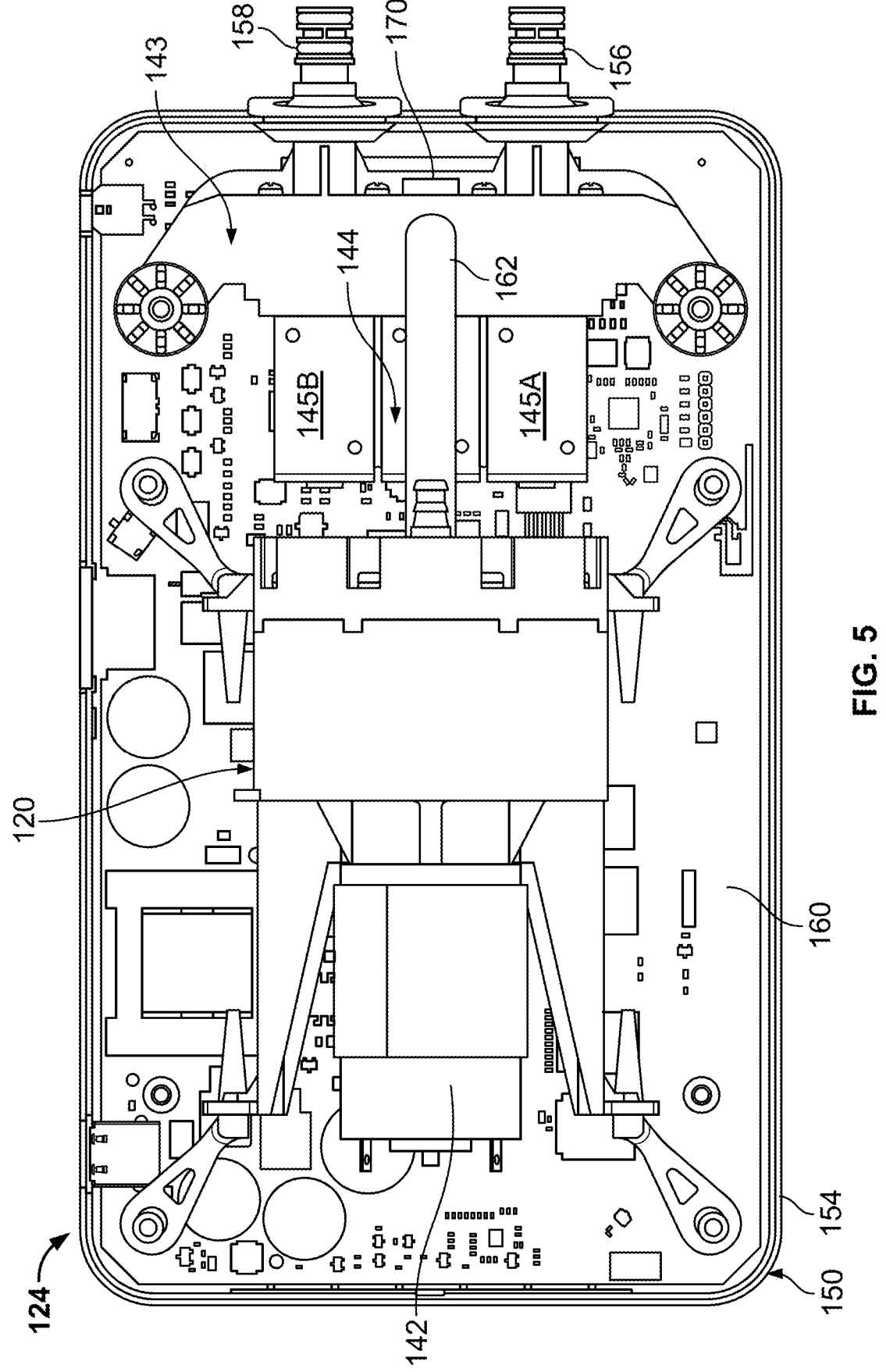
FIG. 5 is a top view of the air controller of FIG. 3 with the top of the housing removed.
Figure 6:
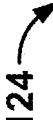
FIG. 6 is a side view of the air controller of FIG. 3 with the top of the housing removed.

FIG. 5 is a top view of the air controller 124 with the housing top 152 removed. FIG. 6 is a side view of the air controller 124 with the housing top 152 removed.

As shown in FIGS. 4-6, the air manifold 143 includes the valves 144, 145A, and 145B attached thereto. The valve 145A can be controlled to selectively open and close to allow and restrict flow through the nozzle 156 to the air chamber 114A (shown in FIGS. 1 and 2). The valve 145B can be controlled to selectively open and close to allow and restrict flow through the nozzle 158 to the air chamber 114B (shown in FIGS. 1 and 2). The valve 144 can be controlled to selectively open and close to allow and restrict flow through an outlet port 170, allowing one of the air chambers 114A and 114B to be deflated when one of their respective valves 145A and 145B is open at the same time as the valve 144. Accordingly, the air manifold 143 can selectively allow air flow between the pump 120 (via the tube 162), the air chamber 114A (via the nozzle 156), the air chamber 114B (via the nozzle 158), and the atmosphere (via the outlet port 170) depending on the open and closed status of the valves 144, 145A, and 145B.

Figure 7:
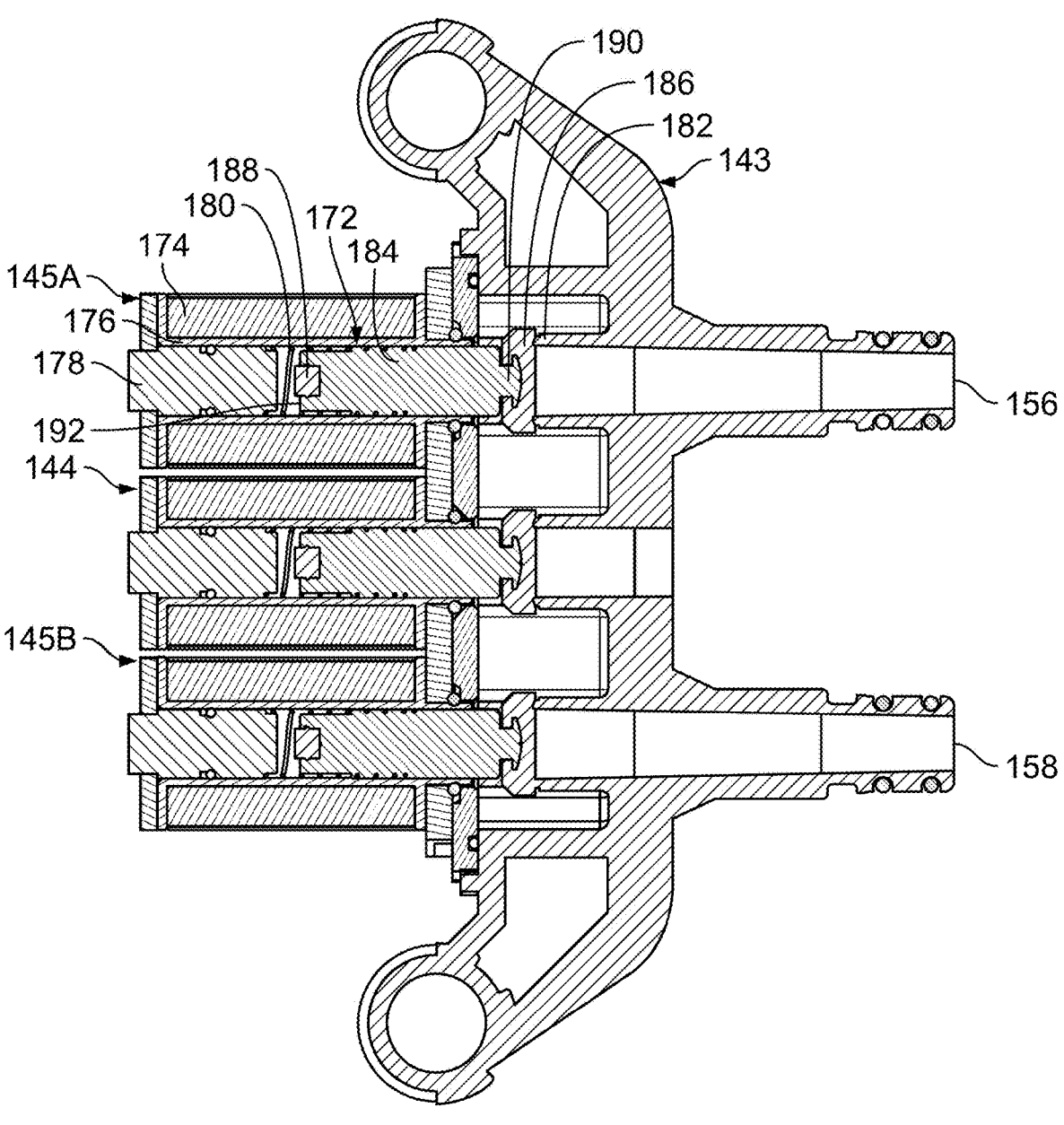
FIG. 7 is a bottom sectional view of an air manifold.

FIG. 7 is a bottom sectional view of the air manifold 143 along with the valves 144, 145A, and 145B. In the embodiment shown in FIG. 7, the valves 144, 145A, and 145B are solenoid valves each with a plunger 172. In some embodiments, the valves 144, 145A, and 145B can include some or all of the same or similar components. For example, the valve 145A can include the plunger 172, a solenoid coil 174, a core tube 176, a seal insert 178 (also called a seal column or a plug nut in some cases), a core spring 180, and a valve seat 182. The plunger 172 can include a core 184, a valve disc 186 (also called a valve member or a valve seal in some cases), and a bumper 188. The valve disc 186 is attached to the core 184 at a head 190 of the core 184 and the bumper 188 is attached to the core 184 at a tail 192 of the core 184.

The core 184 can be a metal that responds to a magnetic field (such as iron, nickel, cobalt, certain steels, and certain alloys) and that moves when the solenoid coil 174 is energized. The core 184 is positioned in the core tube 176, which the solenoid coil 174 is wrapped around. The seal insert 178 seals the core tube 176 behind the core 184 and the core spring 180 is positioned between the seal insert 178 and the core 184 in compression.

FIG. 7 shows the valves 144, 145A, and 145B in the sealed position, in which the core spring 180 presses against the plunger 172 to seal the valve disc 186 against the valve seat 182. When the solenoid coil 174 is energized, it creates a magnetic field that drives the core 184 in a direction toward the tail 192 until the bumper 188 contacts the seal insert 178, at which point the plunger 172 can remain at rest in an open position. In the open position, the valve disc 186 is spaced from the valve seat 182 allowing flow through the valve seat 182 and the nozzle 156. When the solenoid coil 174 is de-energized, the compressed core spring 180 forces the plunger 172 back in the direction toward the head 190 to seal the valve seat 182 with the valve disc 186.

In some embodiments, the bumper 188 can be formed of a resilient polymer material configured to soften impact between the plunger 172 and the seal insert 178 when the valve 145A is opened. In some embodiments, the bumper 188 can be formed of hydrogenated nitrile butadiene rubber ("HNBR"), which can reliably soften impact and resist degradation under operation in the valve 145A. In other embodiments, the bumper 188 can be formed of another nitrile butadiene rubber ("NBR") suitable to reliably soften impact and resist degradation under operation in the valve 145A. In other embodiments, the bumper 188 can be formed of a silicone or an EDPM rubber (ethylene propylene diene monomer (M-class) rubber) having a durometer suitable effectively seal, resist wear, and reduce noise during operation of the valve 145A.

In some embodiments, the valve disc 186 can be formed of a resilient polymer material configured to seal the valve seat 182 and also to soften impact between the plunger 172 and the valve seat 182 when the valve 145A is closed. In some embodiments, the valve disc 186 can be formed of a polymer material that is different than that of the bumper 188. This can be beneficial because the valve disc 186 and the bumper 188 have different applications that benefit from different material properties. For example, the valve disc 186 can be formed of a silicone material, which is suitable for both valve sealing and for softening impact to dampen noise. In other embodiments, the valve disc 186 can be formed of another polymer material suitable for the application as a valve disc 186 in the valve 145A.

As shown in FIG. 7, the valve disc 186 of the plunger 172 can have a diameter larger than that of the valve seat 182, while the head 190 of the core 184 has a diameter less than that of the valve seat 182. Accordingly, when the plunger 172 closes with the core spring 180 forcing the core 184 toward the valve seat 182, the head 190 can tend to push further into the valve seat 182. Because the valve disc 186 is larger than the valve seat 182 and head 190 of the core 184 is smaller than the valve seat 182, the valve disc 186 can tend to bulge when the valve 145A is closed, with a center of the valve disc 186 pushing into the valve seat 182. This bulging action can further dampen the impact between the plunger 172 and the valve seat 182, as the bulging action can slow and ultimately stop movement of the core 184 more slowly than if the plunger 172 had no bulging action when the valve 145A is closed.

In some embodiments, a circumferential edge of the valve seat 182 can be radiused so as to contact the valve disc 186 with a rounded surface. For example, in some embodiments the edge of the valve seat 182 can have a radius of about 0.100 millimeter. In other embodiments, the edge of the valve seat 182 can have a radius of between 0.080 and 0.120 millimeter. In still other embodiments, the edge of the valve seat 182 can have a radius of between 0.030 and 0.200 millimeters.

In embodiments in which the valve disc 186 bulges into the hole defined by the valve seat 182, a radiused edge of the valve seat 182 can have an improved contact surface against the valve disc 186.

Figures 8A, 8B:
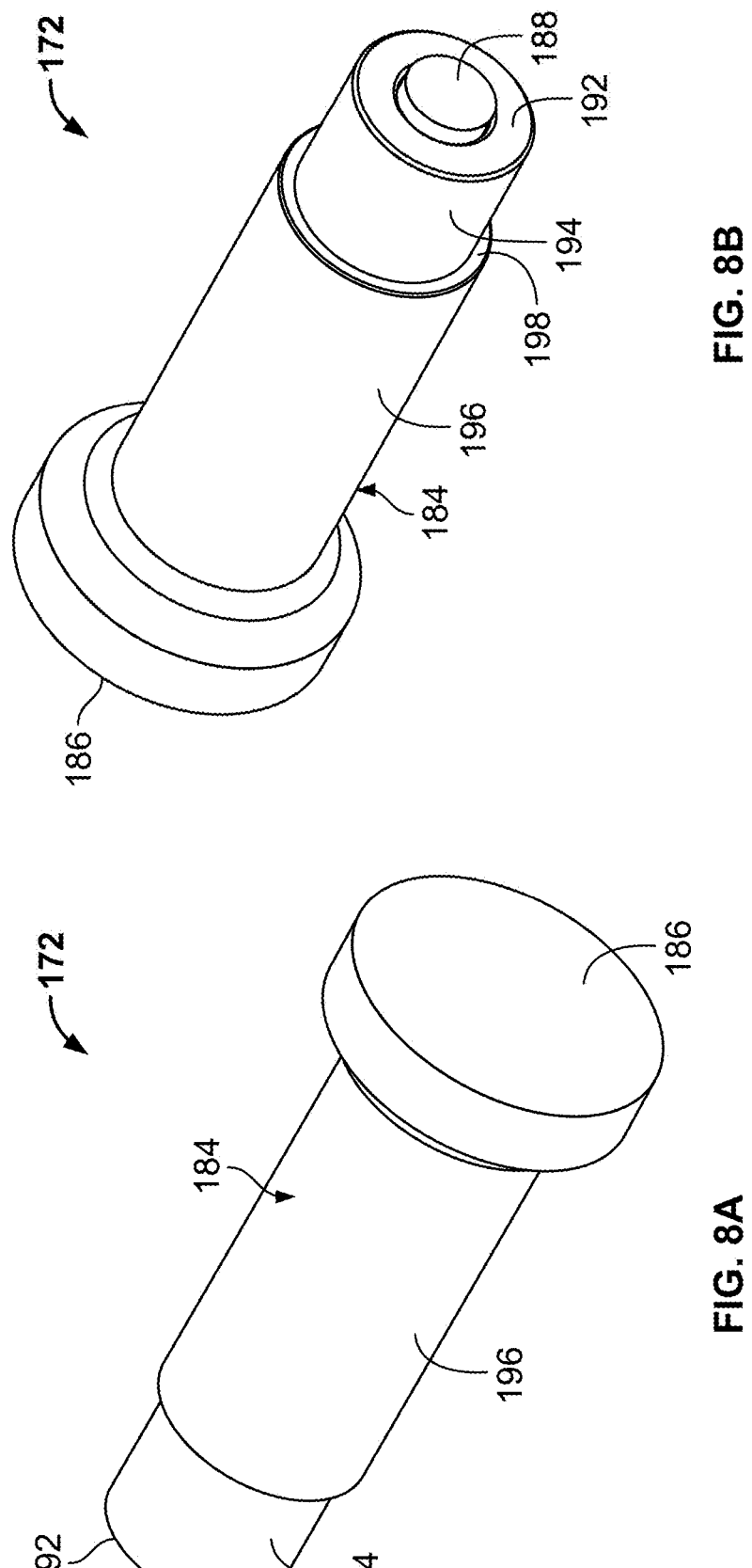
FIG. 8A and FIG. 8B are front and rear perspective views of a plunger for use in the air manifold of FIG. 7.

FIG. 8A is a front perspective view of the plunger 172, showing the valve disc 186 at the head 190 of the core 184 (the head 190 is shown in FIG. 7). FIG. 8B is a rear perspective view of the plunger 172, showing the bumper 188 at the tail 192 of the core 184. The core 184 can have a section 194 with a reduced diameter proximate the tail 192 and a section 196 with a diameter larger than that of section 194 proximate the head 190. The core 184 can define a shoulder 198 extending radially outward from the section 194 to the section 196, and extending circumferentially around the core 184. The core spring 180 (shown in FIG. 7) can wrap at least partially around the section 194 and can abut the shoulder 198 to push against the core 184 and bias the plunger 172 toward the closed position.

Figure 9:
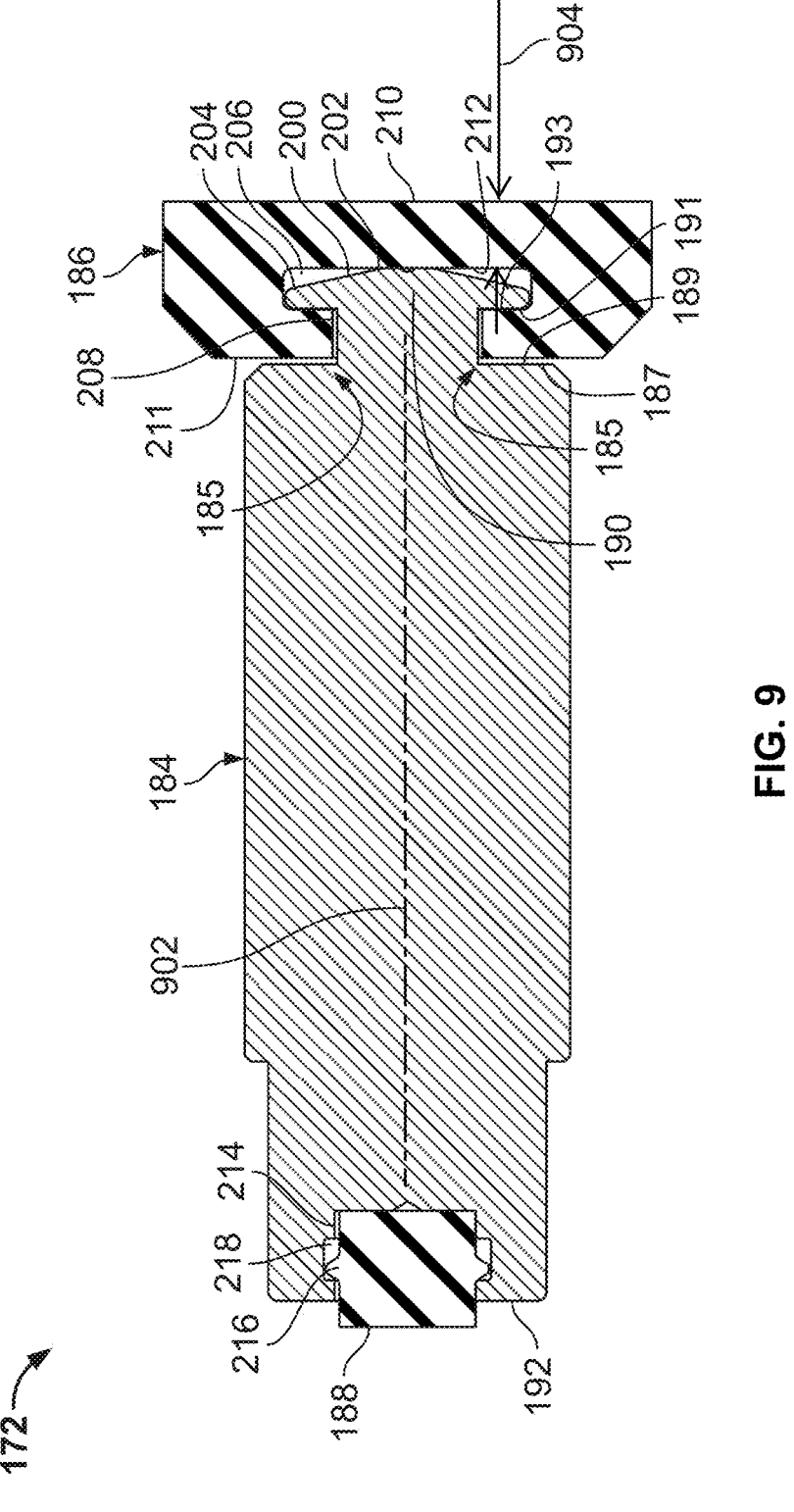
FIG. 9 is a side sectional view of the plunger of FIGS. 8A and 8B.

FIG. 9 is a side sectional view of the plunger 172. As shown in FIG. 9, the head 190 can have a front surface 200 that is chamfered or rounded. The core 184 can be longer (extending further) at a center 202 of the head 190 than at a radially-outer rim 204 of the head 190.

The valve disc 186 can define a receptacle 206 that is sized and configured for receiving the head 190. During assembly, the head 190 can extend through an opening 208 that is positioned opposite of a face 210 of the valve disc 186 and into the receptacle 206. The opening 208 can have a radius that is smaller than both the receptacle 206 and the head 190 so as to retain the head 190 in the receptacle 206 once assembled.

The front surface 200 of the head 190 can be at least partially spaced from an opposing surface 212 of the valve disc 186. For example, in some embodiments the head 190 can abut the opposing surface 212 at the center 202 of the head 190 but be spaced from the opposing surface 212 near the radially-outer rim 204 of the head 190. In other embodiments, the head 190 can be spaced from the opposing surface 212 at both the center 202 and the radially-outer rim 204 of the head 190.

The space in the receptacle 206 between the head 190 and the opposing surface 212 can cushion impact when the plunger 172 closes. For example, when the face 210 of the valve disc 186 contacts the valve seat 182 (shown in FIG. 7) near an outer perimeter of the valve disc 186, that outer perimeter of the valve disc 186 can be stopped, with the core 184 and the center of the valve disc 186 allowed to continue moving at least partially forward. Upon impact, the valve disc 186 can curve such that the head 190 continues moving forward and the space in the receptacle 206 between the head 190 and the opposing surface 212 is reduced or eliminated. This cushioning can reduce noise as a result of closing the valve 145A (and/or the valves 144 and 145B), thus allowing for quieter operation.

A thickness 904 of the valve disc 186 is defined by the distance between the face 210 of the valve disc 186 and the opposing surface 212. The thickness 904 can vary in different embodiments. As the thickness 904 increases, the cushioning can increase, resulting in a further noise reduction. In some cases, as the thickness 904 varies, a strength of the magnetic field can vary. For example, as the thickness 904 increases, the strength of the magnetic field can decrease. For example, as the thickness 904 decreases, the strength of the magnetic field can increase. In other implementations, a shape of the valve disc 186 can be different that shown. Varying the shape of the valve disc 186 can increase or decrease the strength of the magnetic field. The thickness 904 and shape of the valve seat 186 can be selected based on a maintaining the strength of the magnetic field above a threshold strength.

Figure 10:
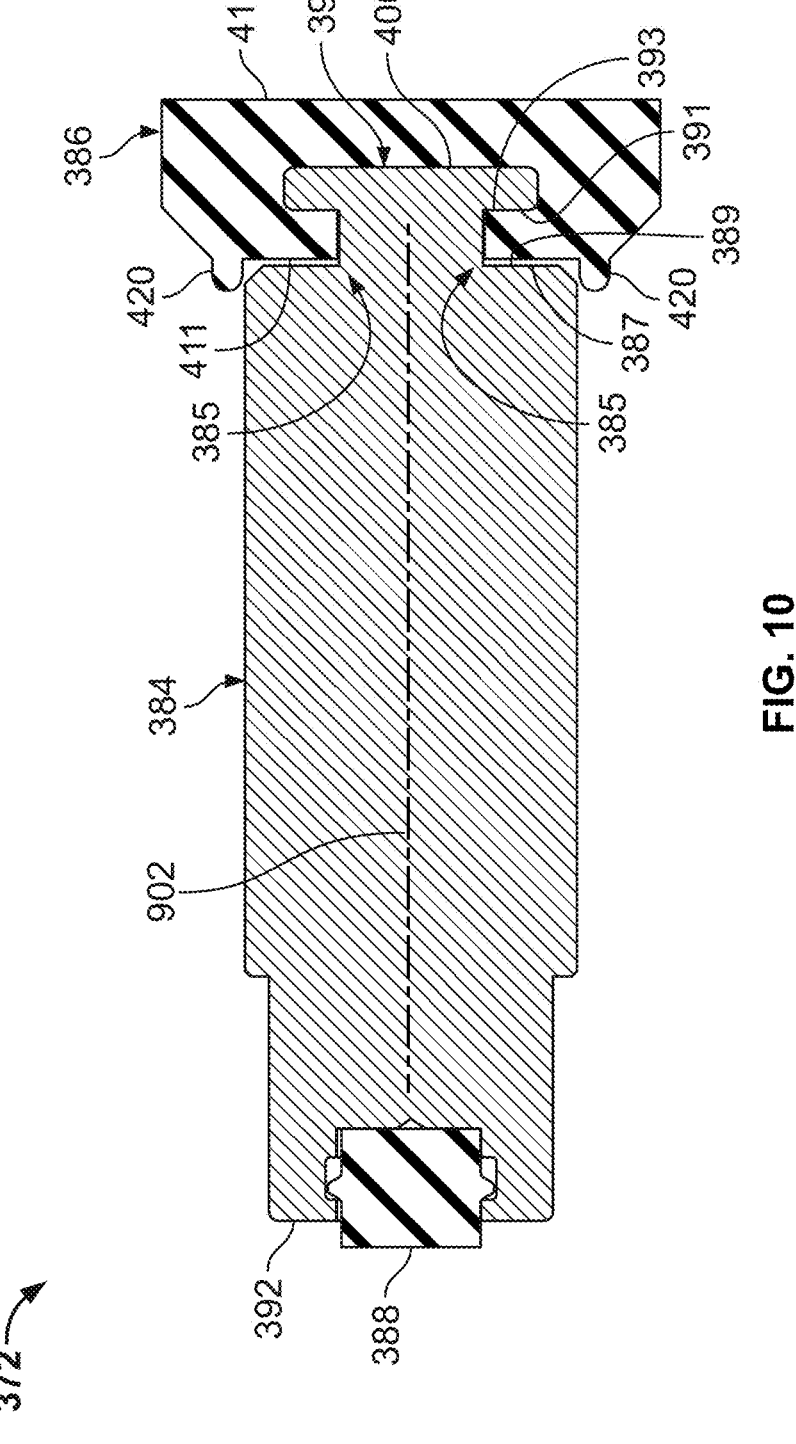
FIG. 10 is a side sectional view of another embodiment of a plunger.

FIG. 9 also shows the bumper 188 positioned at the tail 192 of the core 184. In some embodiments, the core 184 can define a receptacle 214 for receiving and holding the bumper 188. The bumper 188 can have a rim 216 that extends into a groove 218 defined by the core 184 to hold the bumper 188 in place. The bumper 188 can be a projection that extends distally from the tail 192 so as to contact the seal insert 178 when the plunger 172 moves backwards, thus cushioning impact. The bumper 188 can extend from the tail 192 by a distance suitable to reduce or prevent contact between the metal portion of the tail 192 and the seal insert 178. FIG. 10 is a side sectional view of another embodiment of a plunger 372, including a core 384, a valve disc 386, and a bumper 388. In some embodiments, the plunger 372 can have features that are the same or similar to those of the plunger 172 (shown in FIGS. 7-9). In other embodiments, one or more features of the plunger 372 can vary as suitable for the application.

For example, in the illustrated embodiment the core 384 of the plunger 372 is shown with a head 390 that is substantially flat with little or no chamfer or rounding on its front surface 400. In other embodiments, the head 390 can be chamfered or rounded as described above with respect to the head 190 (shown in FIGS. 7-9).

In some embodiments, the valve disc 386 can include one or more projections 420 sized and configured for cushioning movement of the plunger 372 in a backwards direction. For example, the projections 420 can be one or more nubs that extend in a rearward direction opposite of a forward-facing face 410 of the valve disc 386. When the plunger 372 is actuated open and moved in a backwards direction, the projections 420 can contact one or more structures (not shown in FIG. 10) and cushion the stoppage of the plunger 372. Accordingly, the projections 420 can function in a manner similar to that of the bumper 388, except the projections 420 need not be positioned at a tail 392 of the plunger 372.

In some embodiments, the projections 420 can be used in conjunction with the bumper 388. In other embodiments, the projections 420 can be used instead of the bumper 388 to cushion impact and reduce sound when the plunger 372 is actuated to an open position.

Figures 11A, 11B:
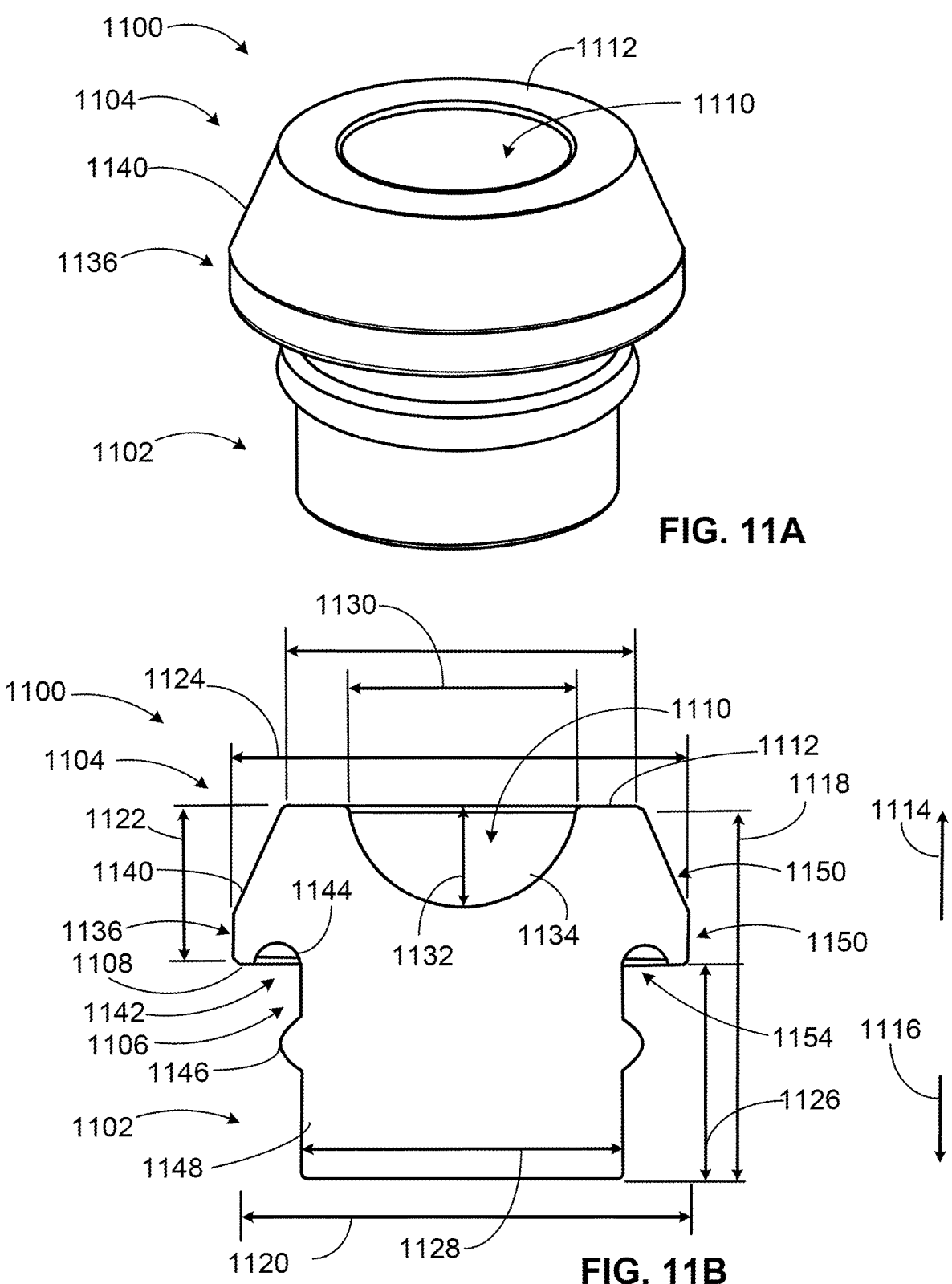
FIG. 11A is a perspective view of a rear-facing bumper for a plunger.
FIG. 11B is a cross-section view of the rear-facing bumper of FIG. 11A.

FIG. 11A is a perspective view of a rear-facing bumper 1100 for a plunger (such as plunger 172, 372). FIG. 11B is a cross-section view of the rear-facing bumper 1100 of FIG. 11A. The rear-facing bumper 1100 can replace the bumpers 188, 388 in the receptacle 214 at the tail 192, 392 of the core 184, 384 shown in FIGS. 9 and 10. The rear-facing bumper 1100 is positioned at the tail 192, 392 of the core 184, 384. The bumper 1100 cushions impact when one or more of the valves 144, 145A, and 145B are opened.

The bumper 1100 has a body 1102 and a head 1104 coupled to the body 1102. The body 1102 is sized to fit partially in the receptacle 214 of the core 184, 384. The head 1104 extends from the body 1102. The head 1104 extends from the body 1102 outside the receptacle 214.

In some cases, when the body 1102 of the rear-facing bumper 1100 is placed in the receptacle 214 of the core 184, 384, a portion 1106 (shown in FIG. 11B) can extend outside the receptacle 214. In some cases, the body 1102 spaces the head 1104 off the tail 192, 392. That is, a forward surface 1108 of the head 1104 is spaced apart from the tail 192, 392. In some cases, the forward surface 1108 of the head 1104 can be in contact with the tail 192, 392.

The rear-facing bumper 1100 includes a cavity 1110 in a rear-facing surface 1112 of the rear-facing bumper 1100. The cavity 1110 extends from the rear-facing surface 1112 toward the core 184, 384 in a forward direction as shown by forward facing arrow 1116 (shown in FIG. 11B). The rear-facing direction is shown by rear facing arrow 1114 (shown in FIG. 11B).

The bumper 1100 has a height 1118 and a width 1120 (an outer diameter, shown in FIG. 11B). The height 1118 of the rear-facing bumper 1100 is measured in a direction parallel to a centerline axis 902 (shown in FIGS. 9 and 10) of the valve core 184, 384. The width 1120 is perpendicular to the height 1118.

The head 1104 of the bumper 1100 has a height 1122 and width (outer diameter) 1124. The height 1122 of the head 1104 is measured in the direction parallel to a centerline axis 902 (shown in FIGS. 9 and 10) of the valve core 184, 384. The width 1124 is perpendicular to the height 1122.

The body 1102 of the bumper 1100 has a height 1126 and width (outer diameter) 1128. The height 1126 of the body 1102 is measured in the direction parallel to a centerline axis 902 (shown in FIGS. 9 and 10) of the valve core 184, 384. The width 1128 is perpendicular to the height 1126.

The cavity 1110 has a diameter 1130 and a depth 1132. The diameter 1130 and the depth 1132 define an inner surface 1134 of the cavity 1110. In some cases, the diameter 1130 and the depth 1132 are the same. The depth 1132 of the cavity 1110 is measured from the rear-facing surface 1112 of the head 1104.

In some cases, referring to FIGS. 11A-B, the cavity 1110 can be a hemisphere. That is, the cavity 1110 can be a hemispherically shaped.

In some cases, the diameter 1130 of the cavity 1110 can be less than the outer diameter 1128 (width) of the body 1102.

In some cases, the depth 1132 of the cavity 1110 can be less than the height 1118 of the head 1104.

In some cases, not shown, the depth 1132 of the cavity 1110 can be equal to a height of the head 1104.

The head 1104 of the rear-facing bumper 1100 can include an outer portion 1136 defined by the outer diameter 1124 being greater than the outer diameter 1128 of the body 1102.

In some cases, the head 1104 is further defined by an edge 1138 connecting the rear-facing surface 1112 to an outer surface 1140 defined by the outer diameter 1124 of the head 1104. Sometimes, the edge 1138 is beveled.

In some cases, the head 1104 includes a channel 1142 on the forward surface 1108. As shown in FIG. 11B, the channel 1142 can contact the body 1102. Alternatively, not shown, the channel 1142 can be spaced apart from the body 1102 between the body 1102 and the outer diameter 1124 of the head 1104. As shown in FIG. 11B, a cross-section 1144 of the channel 1142 can be hemispherical.

The rear-facing bumper 1100 can include a rim 1146 extending radially from an outer surface 1148 of the body 1102. The outer surface 1148 is defined by the width 1128 (the outer diameter). The rim 1146 engages the receptacle 214 to hold the bumper to the core 184, 384. The rim 1146 is sized to fit in the groove 218 of the receptacle 214, holding the rear-facing bumper 1100 in the receptacle 214.

Figure 12A:
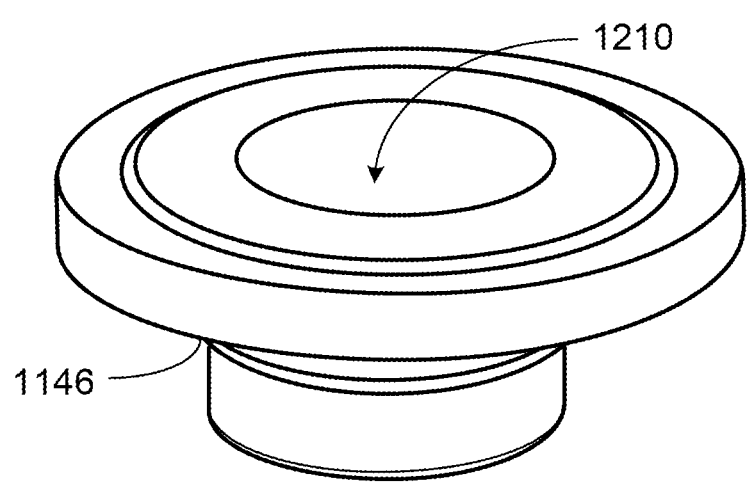
FIG. 12A is a perspective view of another rear-facing bumper for a plunger.
Figure 12B:
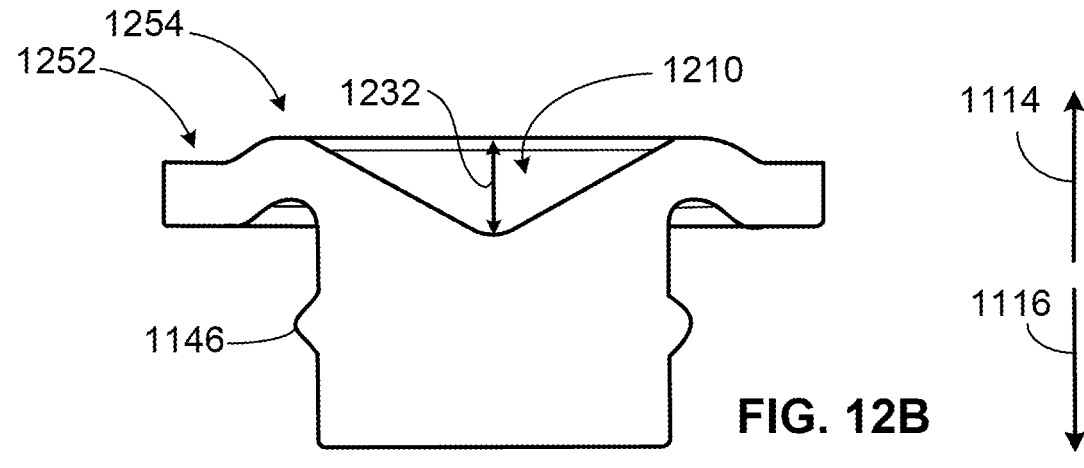
FIG. 12B is a cross-section view of the rear-facing bumper of FIG. 12A having a cavity of a first depth.

FIG. 12A is a perspective view of another rear-facing bumper 1200 for a plunger. FIG. 12B is a cross-section view of the rear-facing bumper 1200 of FIG. 12A having a cavity 1210 of a first depth 1232. Referring to FIG. 12B, the cavity 1210 is conical. In some cases, not shown, the cavity 1210 (or any other cavity in another embodiment, such as cavity 1110) can be frustoconical.

Figure 12C:
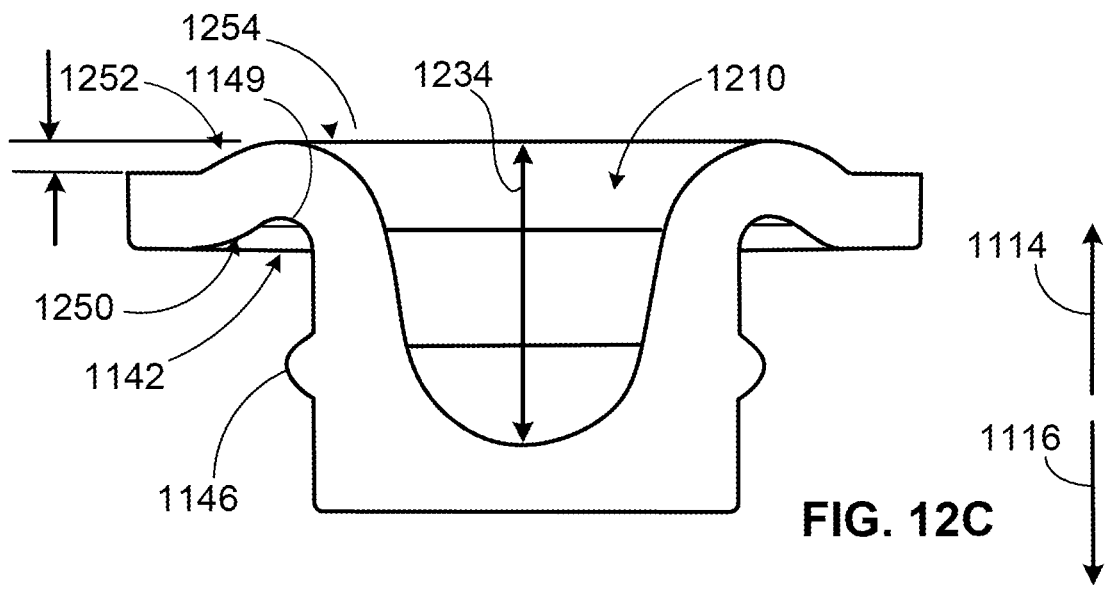
FIG. 12C is a cross-section view of the rear-facing bumper of FIG. 12A having a cavity of a second depth.

FIG. 12C is a cross-section view of the rear-facing bumper 1200 of FIG. 12A having a cavity 1210 of a second depth 1234. In some cases, as shown in FIG. 12C, the cavity is bell-shaped.

Referring to FIGS. 12A-C, in some cases, the diameter 1130 of the cavity 1210 is greater than or equal to an outer diameter 1128 of the body 1102.

In some case, the depth 1132 of the cavity 1210 is greater than a height 1122 of the head 1104. In some cases, the depth 1132 of the cavity 1210 extends from the head 1104 into the body 1102.

Referring to FIGS. 12B-C, in some cases, the cross-section 1144 of the channel 1142 includes a tapered region 1250 extending from the hemispherical cross-section 1144 toward the outer diameter 1124 of the head 1104.

In some cases, an outer portion 1252 of the rear-facing surface 1112 is offset from an inner portion 1254 of the rear-facing surface 1112.

In some cases, the outer portion 1252 of the rear-facing surface 1112 is offset from the inner portion 1254 of the rear-facing surface 1112 in the forward-facing direction 1116.

Referring to FIG. 12C, in some cases, the depth 1234 of the cavity 1210 extends from the head 1104 into the body 1102 past the rim 1146.

In some embodiments, the bumper 1100 has a circumferential rim 1150 extending circumferentially outward from the centerline axis 902 of the valve core 184, 384. The circumferential rim 1150 is in contact with the tail 392 (a rear surface) of the valve core 184, 384 at a radially outer portion 1136 of the circumferential rim 1150. The circumferential rim 1150 is spaced away from the rear surface 392 of the valve core 184, 384 at a portion 1152 of the circumferential rim 1150 that is spaced radially inward from the radially outer portion 1152.

The circumferential rim 1150 defines a hollow annular space 1544 between the circumferential rim 1150 and the rear surface 392 of the valve core 184, 384 at the portion 1154 of the circumferential rim 1150 that is spaced radially inward from the radially outer portion.

Table 1 shows the retention forces of various bumper embodiments. The 360 piston design is generally similar to the bumper 188, 388. The Quiet Version (1) is generally similar to the bumper shown in FIG. 12B. The Quiet Version (2) is generally similar to the bumper shown in FIG. 12C. F is Proportional to $1/R^2$. 1.5 is a comfortable retention force (SF=2), 0.8 is a minimum retention force (no safety factor), and 0.47 is an average force—failures occur.

TABLE 1

| Retention Force Calculation | | | | |
|---|---|---|---|---|
| | Retention Force (F) lbs. force | Distance (R) | | |
| Spring fully compressed | 8.1632653061 | 0.35 | | |
| | 3.3057851240 | 0.55 | | |
| 360 Piston Design | 2.777777778 | 0.6 | mm | 0.024 in |
| Quiet Version (1) | 0.346020761 | 1.7 | mm | 0.067 in |
| Quiet Version (2) | 1.340833131 | 0.8636 | mm | 0.034 in |

Accordingly, a valve for use in a pump system of an air bed can have one or more features that can reduce noise, creating a quieter operating environment. For example, valve plungers can include one or more elastomers at one or more ends configured for cushioning impact during opening and closing of a valve. A valve head can be chamfered or rounded and connect to a valve disc such that curvature of the valve head cushions impact with a valve seat. Relative size and positioning of various components (e.g., valve head, valve disc, valve seat, bumper, etc.) can allow the components to interact in a way such that motion of the valve plunger is arrested in a relatively quiet manner rather than slamming into a stopping structure.

A number of embodiments of the invention have been described. Nevertheless, it will be understood that various modifications may be made without departing from the spirit and scope of the invention. For example, various components illustrated in the air controller 124, such as the pump 120, the air manifold 143, and the printed circuit board 160, can be modified as suitable for a given application. Additionally, in some embodiments the valve plungers and their features described herein can be used in a system other than the air bed system 100 shown and described in FIGS. 1 and 2. Moreover, one or more features present on one or more of the various embodiments can be considered optional and need not necessarily be included in all embodiments. Accordingly, other embodiments are within the scope of the following claims.

What is claimed is:

1. An air bed system comprising:
a mattress having at least one inflatable air chamber;
an air pump; and
a valve configured to be in fluid connection between the air pump and the inflatable air chamber so as to selectively regulate fluid communication between the air pump and the inflatable air chamber, wherein the valve comprises:
a solenoid coil;
a plunger having a core configured to respond to a magnetic field generated by the solenoid coil, the core defining a receptacle at a tail end of the core;
a valve disc positioned at a head end of the core and configured to cushion impact when the valve is closed; and
a bumper positioned at the tail end and configured to cushion impact when the valve is opened, the bumper is positioned partially in the receptacle and extending from the tail end of the core, the bumper comprising:
a body sized to fit partially in the receptacle;
a head extending from the body outside the receptacle; and
a cavity in a rear-facing surface of the head, the cavity extending from the rear-facing surface toward the core, wherein a depth of the cavity is less than a height of the head.

2. The air bed system of claim 1, wherein the valve disc defines a receptacle, wherein the head end of the core is positioned in the receptacle, and wherein a front surface of the head end of the core and an opposing surface in the receptacle of the valve disc are shaped to space at least part of the front surface from the opposing surface.

3. The air bed system of claim 1, wherein the head end of the core comprises a chamfered front surface.

4. The air bed system of claim 1, wherein the head end of the core abuts an opposing surface of the valve disc at a center of the head end and is spaced from the opposing surface near a rim of the head end.

5. The air bed system of claim 1, wherein the bumper is rear-facing and the valve disc is forward facing.

6. The air bed system of claim 1, wherein the head of the bumper comprises:

a portion defining an outer diameter greater than an outer diameter of the body.

7. The air bed system of claim 1, wherein
the head comprises
an edge connecting the rear-facing surface to an outer surface defined by an outer diameter, wherein the edge is beveled.

8. The air bed system of claim 7, wherein the depth of the cavity is defined from the rear-facing surface of the head.

9. The air bed system of claim 8, wherein the cavity is at least one of hemispherical, conical, frustoconical, or bell-shaped.

10. The air bed system of claim 8, wherein a diameter of the cavity is less than an outer diameter of the body.

11. The air bed system of claim 8, wherein a diameter of the cavity is greater than or equal to an outer diameter of the body.

12. The air bed system of claim 7, wherein the bumper further comprises a rim extending radially from an outer surface of the body, the rim sized to fit in a groove of the receptacle, holding the bumper in the receptacle.

13. An air bed system comprising:
a mattress having at least one inflatable air chamber;
an air pump; and
a valve configured to be in fluid connection between the air pump and the inflatable air chamber so as to selectively regulate fluid communication between the air pump and the inflatable air chamber, wherein the valve comprises:
a solenoid coil;
a plunger having a core configured to respond to a magnetic field generated by the solenoid coil, the core defining a receptacle at a tail end of the core;
a valve disc positioned at a head end of the core and configured to cushion impact when the valve is closed; and
a bumper positioned at a tail end and configured to cushion impact when the valve is opened, the bumper is positioned partially in the receptacle and extending from the tail end of the core, the bumper comprising:
a body sized to fit partially in the receptacle;
a head extending from the body outside the receptacle; and
a cavity in a rear-facing surface of the head, the cavity extending from the rear-facing surface toward the core, wherein a depth of the cavity is equal to a height of the head.

14. An air bed system comprising:
a mattress having at least one inflatable air chamber;
an air pump; and
a valve configured to be in fluid connection between the air pump and the inflatable air chamber so as to selectively regulate fluid communication between the air pump and the inflatable air chamber, wherein the valve comprises:
a solenoid coil;
a plunger having a core configured to respond to a magnetic field generated by the solenoid coil, the core defining a receptacle at a tail end of the core;
a valve disc positioned at a head end of the core and configured to cushion impact when the valve is closed; and
a bumper positioned at the tail end and configured to cushion impact when the valve is opened, the bumper is positioned partially in the receptacle and extending from the tail end of the core, the bumper comprising:
a body sized to fit partially in the receptacle; and
a head extending from the body outside the receptacle; and
a cavity in a rear-facing surface of the head, the cavity extending from the rear-facing surface toward the core, wherein a depth of the cavity extends from the head into the body past a rim extending from the body.

15. An air bed system comprising:
a mattress having at least one inflatable air chamber;
an air pump; and
a valve configured to be in fluid connection between the air pump and the inflatable air chamber so as to selectively regulate fluid communication between the air pump and the inflatable air chamber, wherein the valve comprises:
a solenoid coil;
a plunger having a core configured to respond to a magnetic field generated by the solenoid coil, the core defining a receptacle at a tail end of the core;
a valve disc positioned at a head end of the core and configured to cushion impact when the valve is closed; and
a bumper positioned at the tail end and configured to cushion impact when the valve is opened, the bumper is positioned partially in the receptacle and extending from the tail end of the core, the bumper comprising:
a body sized to fit partially in the receptacle;
a head extending from the body outside the receptacle; and
a cavity in a rear-facing surface of the head, the cavity extending from the rear-facing surface toward the core, wherein the head comprises a channel on a forward-facing surface of the head, the forward-facing surface opposite the rear-facing surface, wherein the channel contacts the body of the bumper, wherein a cross-section of the channel comprises:
a hemispherical portion; and
a tapered region extending from the hemispherical portion toward an outer diameter of the head.

16. The air bed system of claim 15, wherein a depth of the cavity is greater than a height of the head.

17. The air bed system of claim 15, wherein a depth of the cavity extends from the head into the body.

18. An air bed system comprising:
a mattress having at least one inflatable air chamber;
an air pump; and a valve configured to be in fluid connection between the air pump and the inflatable air chamber so as to selectively regulate fluid communication between the air pump and the inflatable air chamber, wherein the valve comprises:

a solenoid coil;

a plunger having a core configured to respond to a magnetic field generated by the solenoid coil, the core defining a receptacle at a tail end of the core;

a valve disc positioned at a head end of the core and configured to cushion impact when the valve is closed; and a bumper positioned at the tail end and configured to cushion impact when the valve is opened, the bumper is positioned partially in the receptacle and extending from the tail end of the core, the bumper comprising:

a body sized to fit partially in the receptacle;

a head extending from the body outside the receptacle; and a cavity in a rear-facing surface of the head, the cavity extending from the rear-facing surface toward the core, wherein an outer portion of the rear-facing surface is offset from an inner portion of the rear-facing surface, the outer portion of the rear-facing surface offset from the inner portion of the rear-facing surface in a forward-facing direction.

19. The air bed system of claim 18 wherein a depth of the cavity is less than a height of the head.

20. The air bed system of claim 18, wherein a diameter of the cavity is less than an outer diameter of the body.

* * * * *